US012777126B2

(12) United States Patent
Shindo et al.

(10) Patent No.: US 12,777,126 B2
(45) Date of Patent: Oct. 27, 2026

(54) INFORMATION PROCESSING APPARATUS, METHOD OF CONTROLLING THE SAME, AND STORAGE MEDIUM

(71) Applicant: CANON KABUSHIKI KAISHA, Tokyo (JP)

(72) Inventors: Yukihiro Shindo, Chiba (JP); Hidekazu Nakashio, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 288 days.

(21) Appl. No.: 18/592,417

(22) Filed: Feb. 29, 2024

(65) Prior Publication Data

US 2024/0314257 A1 Sep. 19, 2024

(30) Foreign Application Priority Data

Mar. 16, 2023 (JP) ................................ 2023-042320

(51) Int. Cl.
*H04N 1/60* (2006.01)

(52) U.S. Cl.
CPC ................................ *H04N 1/6033* (2013.01)

(58) Field of Classification Search
CPC ......... H04N 1/6033; G01J 3/52; G01J 3/0264
See application file for complete search history.

(56) References Cited

U.S. PATENT DOCUMENTS

| | | | | |
|---|---|---|---|---|
| 11,636,294 B2 | 4/2023 | Shindo et al. | ......... | G06K 15/02 |
| 2019/0387133 A1* | 12/2019 | Ito | ............................ | H04N 1/38 |
| 2020/0064196 A1* | 2/2020 | Inada | .................. | H04N 1/6055 |
| 2022/0294932 A1* | 9/2022 | Morales | ............... | H04N 1/6033 |
| 2022/0360687 A1* | 11/2022 | Chang | .................... | H04N 1/605 |

FOREIGN PATENT DOCUMENTS

JP 2020-030754 2/2020

OTHER PUBLICATIONS

U.S. Appl. No. 18/619,077, filed Mar. 27, 2024.

* cited by examiner

*Primary Examiner* — Iriana Cruz
(74) *Attorney, Agent, or Firm* — Venable LLP

(57) ABSTRACT

An information processing apparatus manages a color to be printed by a printer based on measurement data of color patches arranged on a chart printed by the printer. The apparatus generates a color inspection job based on the set specification of the color inspection print job, in a case when there are a plurality of charts corresponding to a plurality of color inspection jobs, each chart having been printed by the printer based on a respective color inspection job, generates a measurement job in which the plurality of charts are collectively designated as measurement targets, obtains a measurement result for the chart for each of the plurality of color inspection jobs designated as the measurement target, outputs the measurement result as appropriate for each color inspection job, and performs processing for managing the color based on the measurement result and the specification of the color inspection print job.

14 Claims, 19 Drawing Sheets

201

INPUT RGB VALUES (PATCH RGB VALUES)

| PATCH NUMBER | R | G | B |
|---|---|---|---|
| 1 | 0 | 0 | 0 |
| 2 | 0 | 0 | 32 |
| 3 | 0 | 0 | 64 |
| 4 | 0 | 0 | 96 |
| 5 | 0 | 0 | 128 |
| ... | ... | ... | ... |
| 721 | 255 | 255 | 0 |
| 722 | 255 | 255 | 32 |
| 723 | 255 | 255 | 64 |
| 724 | 255 | 255 | 96 |
| 725 | 255 | 255 | 128 |
| 726 | 255 | 255 | 160 |
| 727 | 255 | 255 | 192 |
| 728 | 255 | 255 | 224 |
| 729 | 255 | 255 | 255 |

202

COLOR CHARACTERISTICS

| PATCH NUMBER | L* | a* | b* |
|---|---|---|---|
| 1 | 16.68 | -0.02 | 0.01 |
| 2 | 17.09 | 2.79 | -4.48 |
| 3 | 17.86 | 4.69 | -10.09 |
| 4 | 18.36 | 6.87 | -15.95 |
| 5 | 18.81 | 9.46 | -21.09 |
| ... | ... | ... | ... |
| 721 | 88.33 | -6.64 | 88.44 |
| 722 | 88.86 | -7.30 | 78.13 |
| 723 | 89.24 | -7.59 | 65.79 |
| 724 | 89.81 | -7.28 | 55.15 |
| 725 | 90.38 | -6.55 | 44.60 |
| 726 | 90.84 | -5.27 | 32.52 |
| 727 | 91.34 | -3.62 | 20.94 |
| 728 | 91.78 | -1.80 | 10.22 |
| 729 | 92.49 | 0.17 | 1.12 |

FIG. 10A

| STANDARD CERTIFICATION | JapanColor2011Lab CERTIFICATION (DIGITAL PRINTING CERTIFICATION) | JapanColor 2011 DENSITY CERTIFICATION | Fogra 51 PSD |
|---|---|---|---|
| STATUS | — | STATUS T | — |
| WHITE CONDITION | ABSOLUTE WHITE REFERENCE | ABSOLUTE WHITE REFERENCE | ABSOLUTE WHITE REFERENCE |
| ILLUMINATION CONDITION | M0 | M0 | M1 |
| ILLUMINANT (OBSERVATION LIGHT SOURCE) | D50 | — | D50 |
| VIEW ANGLE | 2 DEGREES | — | 2 DEGREES |
| GEOMETRICAL CONDITION | 0/45 or 45/0 | 0/45 or 45/0 | 0/45 or 45/0 |

FIG. 10B

| STANDARD CERTIFICATION | JapanColor2011Lab CERTIFICATION (DIGITAL CERTIFICATION) | Fogra 51 PSD | ISO 12647-7 Proof Printing |
|---|---|---|---|
| AVERAGE ΔE00 | 2 OR LESS | LESS THAN 2.5 | 2.5 OR LESS |
| MAXIMUM ΔE00 | 6 OR LESS | — | 5.0 OR LESS |
| SPOT ΔE00 | — | LESS THAN 2.5 | 3.0 OR LESS |
| 95% ΔE00 | 4 OR LESS | LESS THAN 4.5 | 5.0 OR LESS |

INFORMATION PROCESSING APPARATUS, METHOD OF CONTROLLING THE SAME, AND STORAGE MEDIUM

CROSS-REFERENCE TO PRIORITY APPLICATION

This application claims the benefit of Japanese Patent Application No. 2023-042320, filed Mar. 16, 2023, which is hereby incorporated by reference herein in its entirety.

BACKGROUND OF THE INVENTION

Field of the Invention

The present invention relates to an information processing apparatus, a method of controlling the same, and a storage medium.

Description of the Related Art

Generally, in commercial color printers, inspection of color accuracy (color inspection) of the printer is performed periodically (e.g. every morning) to ensure a consistent color reproducibility. Color inspection is performed by comparing a color (reference color) serving as a reference defined by a standard (e.g., International Standard Organization (ISO)) with a color (printed color) actually printed by the printer and confirming whether the color accuracy satisfies passing criteria. Then, upon receiving a passing result for the color inspection, the production of commercial printed matters by the printer is started.

At this time, if the color accuracy does not satisfy the passing criteria, print profile regeneration or correction processing in which a color correction function of the printer is used will be necessary to improve the color accuracy. These tasks take time and effort and thus need to be performed efficiently.

Japanese Patent Laid-Open No. 2020-30754 discloses a technique for performing color inspection at a plurality of points in time of printing and determining intervals at which to execute color correction work based on a result of that color inspection as well as displaying an inspection result history.

However, in prior art, in a case that a plurality of printers are used, the printers are operated as appropriate starting from those that passed the color inspection. For example, when conducting color inspection jobs of a plurality of printers, an on-site worker cannot collectively measure the charts of a plurality of color inspection jobs, and so measuring work was inefficient. Specifically, since the on-site worker completes color inspection jobs one at a time, the on-site worker needs to repeat a workflow (e.g., select a color inspection job for a measurement target, start a measurement job, prepare a measuring device, transmit a measurement result, complete the measurement job, and confirm a color inspection result) for the number of printers. Therefore, each time a single color inspection job is performed, there are switching processing of the measuring device and a pointing device, measurement job start/completion processing, measurement result communication processing, color inspection processing, and the like, and so, it was not possible for only the chart measuring work to be consecutively performed, thereby resulting in inefficiency.

SUMMARY OF THE INVENTION

Embodiments of the present disclosure eliminate the above-mentioned issues with conventional technology.

A feature of embodiments of the present disclosure is to provide a technique for increasing the efficiency of measuring work in a plurality of color inspection tasks, while allowing individual color inspection results to be received as appropriate.

According to embodiments of the present disclosure, an information processing apparatus operable to manage a color to be printed by a printer based on measurement data of color patches arranged on a chart printed by the printer comprises one or more controllers including one or more processors and one or more memories, the one or more controllers configured to set a specification of a color inspection print job necessitating measurement for managing color, generate a color inspection job based on the set specification of the color inspection print job, in a case when there are a plurality of charts corresponding to a plurality of color inspection jobs, each chart having been printed by the printer based on a respective color inspection job, to generate a measurement job in which the plurality of charts are collectively designated as measurement targets; obtain a measurement result for the chart for each of the plurality of color inspection jobs designated as the measurement target, and to output the measurement result as appropriate for each color inspection job, and to perform processing for managing the color based on the measurement result and the specification of the color inspection print job.

According to embodiments of the present disclosure, a method of controlling an information processing apparatus operable to manage a color to be printed by a printer based on measurement data of color patches arranged on a chart printed by the printer, comprises setting a specification of a color inspection print job necessitating measurement for managing color, generating a color inspection job based on the set specification of the color inspection print job, in a case when there are a plurality of charts corresponding to a plurality of color inspection jobs, each chart having been printed by the printer based on a respective color inspection job, generating a measurement job in which the plurality of charts are collectively designated as measurement targets, obtaining a measurement result for the chart for each of the plurality of color inspection jobs designated as the measurement target, and outputting the measurement result as appropriate for each color inspection job, and performing processing for managing the color based on the measurement result and the specification of the color inspection print job.

Further features of the present disclosure will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the disclosure and, together with the description, serve to explain the principles of the disclosure.

FIG. 10A is a diagram illustrating an example of a measurement condition set on a measurement condition setting screen.

FIG. 10B is a diagram illustrating an example of an allowable value set on an allowable value setting screen.

DESCRIPTION OF THE EMBODIMENTS

Embodiments of the present disclosure will be described hereafter in detail, with reference to the accompanying drawings. It is to be understood that the following embodiments are not intended to limit the claims of the present disclosure, and that not all of the combinations of the aspects that are described according to the following embodiments are necessarily required with respect to the means to solve the issues according to the present disclosure.

Figure 1:
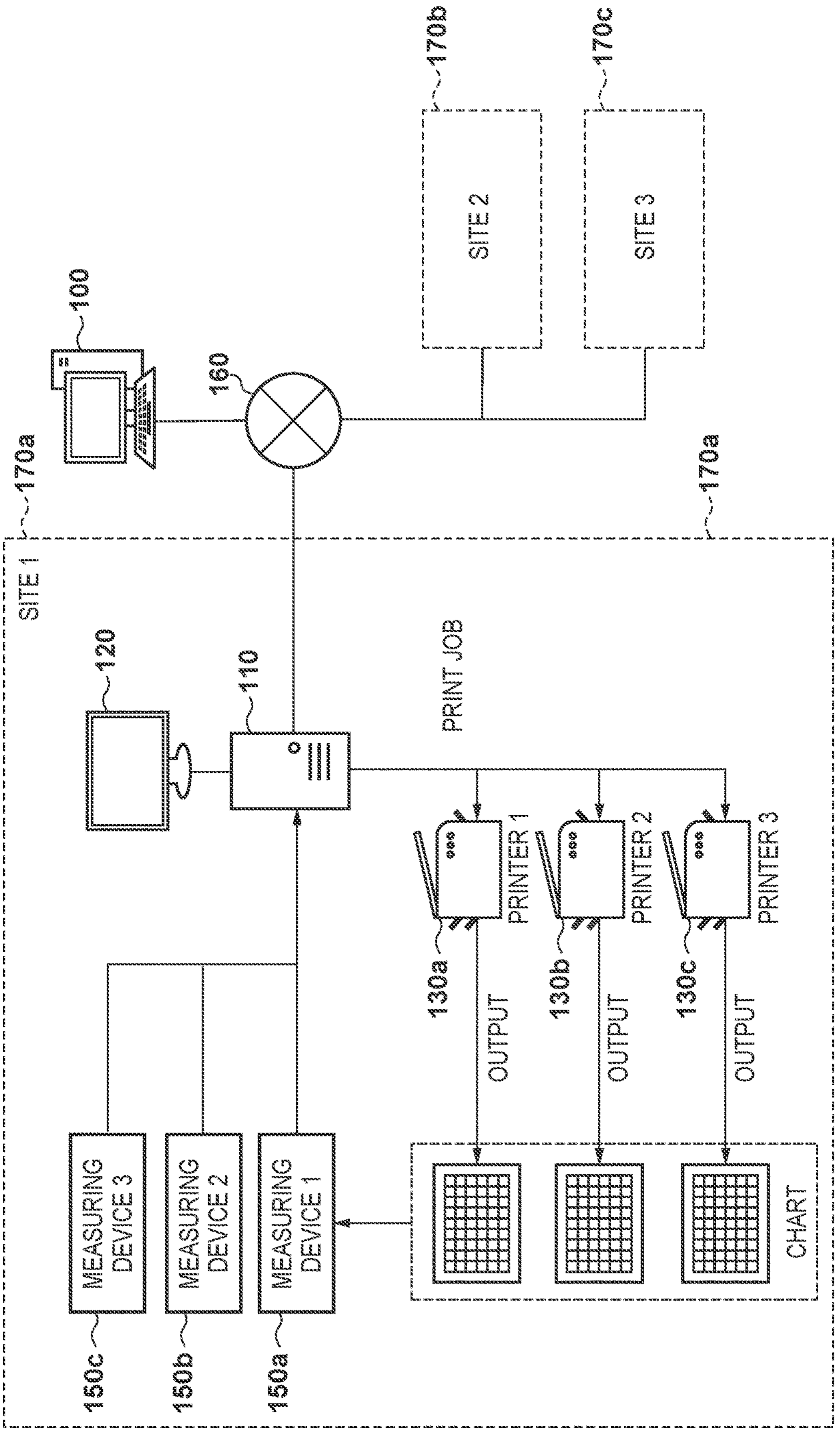
FIG. 1 is a conceptual diagram illustrating an overall configuration of a color management system according to an embodiment of the present invention.

FIG. 1 is a conceptual diagram illustrating an overall configuration of a color management system according to an embodiment of the present invention.

In the color management system, color inspection of each printer is periodically performed to unitarily manage the colors of the printers. In color inspection, first, a predetermined chart is printed in a target printer. Next, a measuring device measures the color patches of the printed chart and confirms a difference (color accuracy) between reference colors and the obtained measurement data of printed colors. The color patches arranged in the chart are also referred to as color patches or color samples, and there are cases when the color patches are simply referred to as "patches" in the present specification.

In the color management system illustrated in FIG. 1, a color management apparatus 100 and sites 1 to 3 (170*a* to 170*c*) are connected by a network 160. The site 1 includes a control apparatus 110, a monitor 120, printers 1 to 3 (130*a* to 130*c*), and measuring devices 1 to 3 (150*a* to 150*c*). The site 2 and the site 3 also each includes a control apparatus, a monitor, printers, and measuring devices. Hereafter, a description will be given using a relationship between the site 1 and the color management apparatus 100 as an example, but relationships with other sites are also similar.

The color management apparatus 100 is connected to the control apparatus 110 via the network 160 so as to be capable of mutual communication. The color management apparatus 100 includes a setting function for setting a specification of a color inspection print job and issues a color inspection job according to the set color inspection print job. Then, the color management apparatus 100 generates a color inspection chart to which an ID (identification information) associated with the color inspection job has been assigned and provides the color inspection chart to the control apparatus 110. Then, the color management apparatus 100 prints the color inspection chart via the control apparatus 110, using a target printer corresponding to printer information set in the color inspection print job.

The color management apparatus 100 compares a color (reference color) serving as a preset reference with the measured value of a color (printed color) actually printed in the printer obtained via the control apparatus 110 and inspects whether color accuracy of the printed color satisfies passing criteria. The color management apparatus 100 also unitarily manages color inspection results of printers connected to each other via the control apparatus 110.

The control apparatus 110 is connected to the printers 130*a* to 130*c* at the site 1 via a communication network, such as an intranet, so as to be capable of mutual communication and obtains device information of each printer and issues print instructions to each printer. The device information of a printer includes print condition information, such as available sheet information and available print profiles. The print instruction to a printer includes a print instruction for a color inspection chart received from the color management apparatus 100.

The control apparatus 110 is connected to the measuring devices 150*a* to 150*c* of the site 1 via a communication network, such as a USB cable or intranet, so as to be capable of mutual communication and controls each measuring device. Then, the control apparatus 110 transmits measurement data obtained from the measuring devices 150*a* to 150*c* to the color management apparatus 100. The monitor 120 is connected to the control apparatus 110 and displays various kinds of user interface screens (UI screens).

The printers 130*a* to 130*c* print color images on sheets based on print jobs from the control apparatus 110 using, for example, an electrophotographic process technology. The printers 130*a* to 130*c* may be monochrome printers or printers based on another image forming method, such as inkjet. The printers 130*a* to 130*c* may be multi-function peripherals in which a copy function and a fax function are included in addition to a print function.

The measuring devices 150*a* to 150*c* are spectrophotometers, which measure a color value of an object based on a reflectance or transmittance of visible light having a wavelength of about 400 nm to 700 nm. The measuring devices 150*a* to 150*c* are prepared, for example, for each site, and measurement data is obtained by converting a wavelength obtained for each patch of the charts printed by the printers 130*a* to 130*c* into a value in the L*a*b* color space or XYZ color space, for example.

Figure 2:
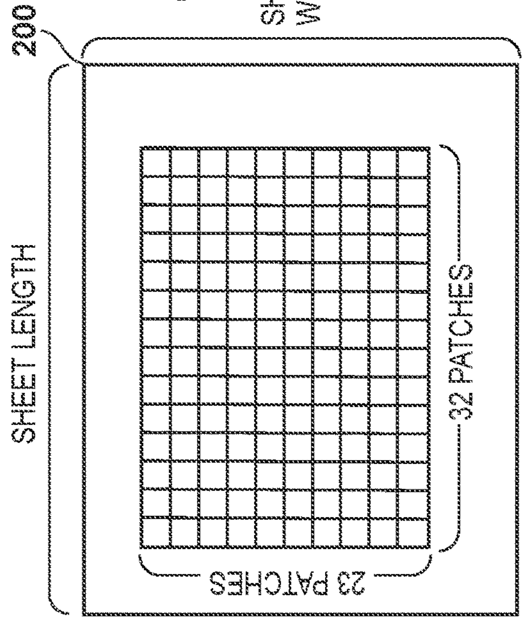
FIG. 2 is a diagram for explaining a chart according to the embodiment.

FIG. 2 is a diagram for explaining a chart according to the embodiment.

A reference numeral 200 denotes an example of the entire chart, and a reference numeral 201 denotes signal values (RGB values) defined using an RGB color space corresponding to respective patches (patch numbers 1 to 729) of the chart. In addition, a reference numeral 202 denotes an example of measurement data for which a color value of each patch on the chart printed by a printer has been obtained by a measuring device. The signal values of the reference numeral 201 are not limited to the RGB color space signal values but may be signal values (CMYK values) defined using a CMYK color space.

The measuring devices 150*a* to 150*c* are, for example, measuring devices with a built-in line sensor or area sensor for scanning a chart. If the measuring devices are a type of measuring device such as a sheet-through automatic document reading devices, by having a built-in line sensor or area sensor, they can pre-scan a chart and, after detecting the position of patches to be measured, perform measurement. By using an automatic feeding unit in addition to manual feeding in which charts are manually fed one at a time, some sheet-through measuring devices can automatically feed chart one at a time and measure consecutive pages when a plurality of charts are loaded on the automatic feeding unit and measurement is started. The present invention is not limited to measuring devices such as sheet-through measuring devices and may be, for example, portable (handheld) measuring devices that perform measurement while being manually moved over the patches of a chart.

The network 160 may be, for example, a local area network (LAN), the Internet, an intranet, or the like and may be wired or wireless.

The sites 1 to 3 (170*a* to 170*c*) correspond to the locations, or the like, of printing companies where printers are installed. For example, the site 1 is a printing site in Tokyo, the site 2 is a printing site in Osaka, and the site 3 is a printing site in Fukuoka.

The configuration of the color management system illustrated in FIG. 1 is only one example, and the number of sites and the configuration of apparatuses at each site can be changed as appropriate. For example, when the color management apparatus 100 is installed at each of the sites 1 to 3, a configuration in which the color management apparatus 100 is directly connected to printers and measuring devices and the color management apparatus 100 can issue chart print instructions to the printers and obtain measurement data from the measuring devices without passing through the control apparatus 110 may be taken.

A configuration, in which an information processing apparatus having functions of both the color management apparatus 100 and the control apparatus 110, is provided for each site and that information processing apparatus performs color management of a plurality of printers at the site may be taken.

The above-described color management apparatus 100 and the control apparatus 110 both are information processing apparatuses and are realized by, for example, general-purpose notebook/desktop personal computers, server terminals, or tablet terminals.

Figure 3:
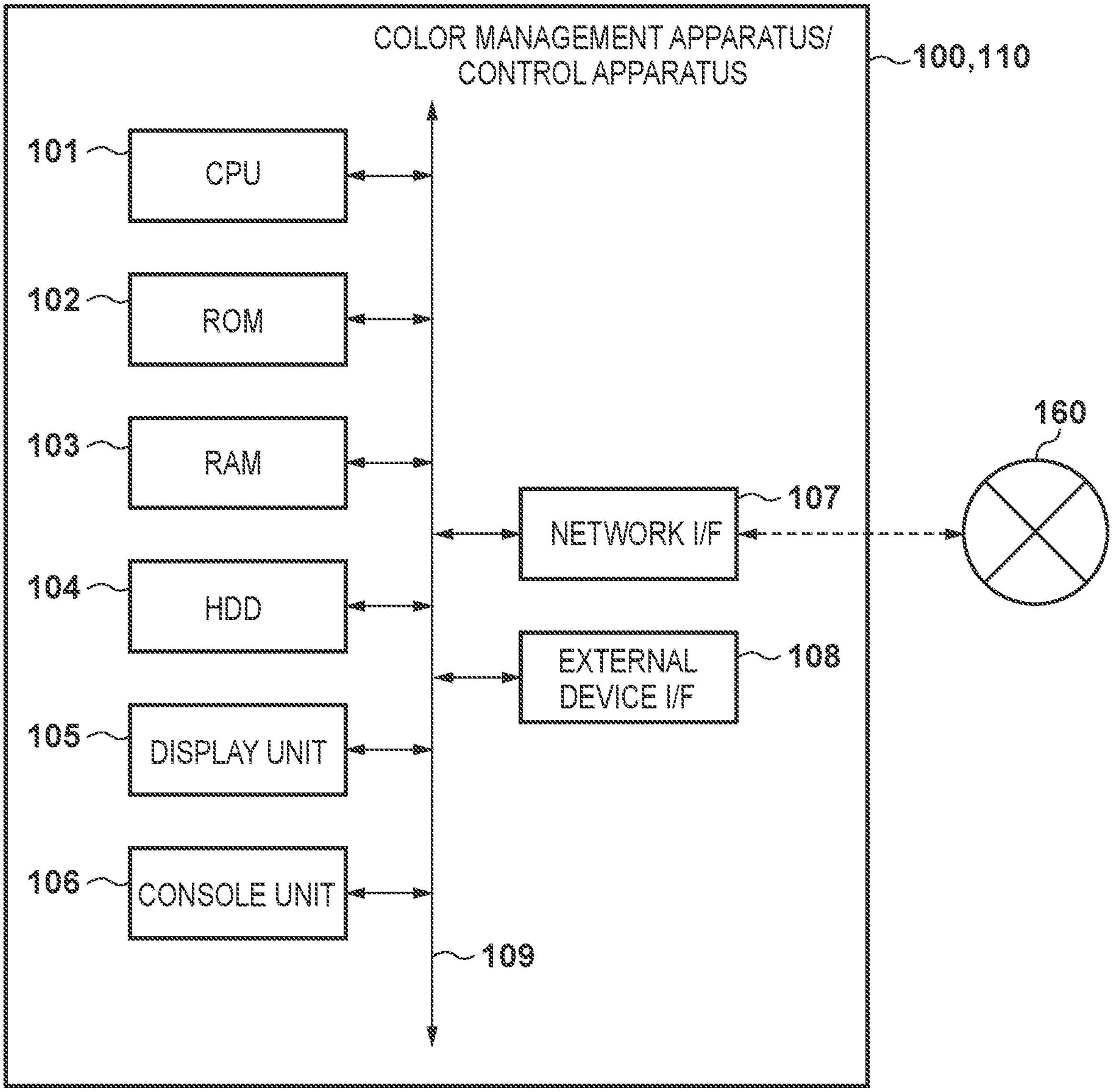
FIG. 3 is a block diagram for describing a hardware configuration of a color management apparatus and a control apparatus according to the embodiment.

FIG. 3 is a block diagram for describing a hardware configuration of the color management apparatus 100 and the control apparatus 110 according to the embodiment.

The color management apparatus 100 and the control apparatus 110 include a CPU 101, a ROM 102, a RAM 103, a hard disk drive (HDD) 104, a display unit 105, a console unit 106, a network interface (I/F) 107, and an external device I/F 108. The respective units 101 to 108 illustrated in FIG. 3 are connected to each other via a system bus 109.

The CPU 101 is a central processing unit for controlling the entire apparatus and executes each image process to be described later by deploying in the RAM 103 a program stored in the ROM 102 and executing the program. The ROM 102 is a read-only memory and stores a boot program, processing programs, character data, character code information, and the like. The RAM 103 is a random access memory and is used as an area in which the CPU 101 deploys programs when executing various kinds of programs as well as a working memory. The RAM 103 is also used as a data storage area for image files received from the network I/F 107. The HDD 104 is used for storing the results of computation processing executed by the CPU 101, various kinds of programs, respective information files, and the like. The display unit 105 includes, for example, a liquid crystal display, or the like and, for example, displays user interface screens for performing various kinds of settings and confirming apparatus states. The console unit 106 includes a keyboard, a pointing device, and the like, and is used by a user, for example, to input or reset various setting values. The display unit 105 includes a touch panel function and may be configured to substitute for a part of the functions of the console unit 106. The network I/F 107 is an interface for connecting the apparatus 100 or 110 to the network 160. The color management apparatus 100 and the control apparatus 110 can each transmit and receive various kinds of information to and from an external apparatus via the network I/F 107. The external device I/F 108 is, for example, an interface for connecting external devices, such as the measuring devices 150*a* to 150*c*, via a communication bus, such as a Universal Serial Bus (USB).

Next, a software configuration of the color management apparatus 100 and the control apparatus 110 will be described.

Figure 4:
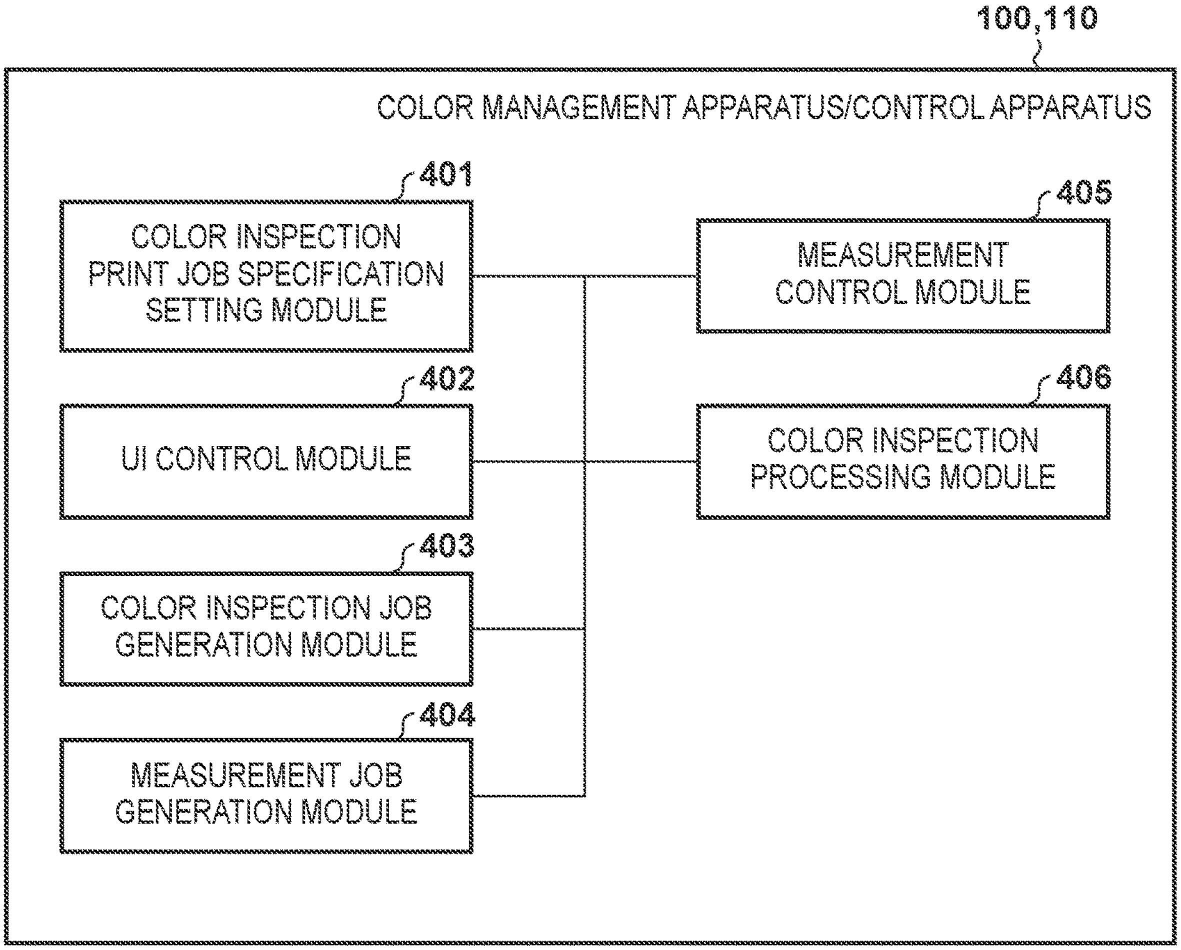
FIG. 4 is a functional block diagram for describing a main functional configuration of the color management apparatus and the control apparatus according to the embodiment.

FIG. 4 is a functional block diagram for describing a main functional configuration of the color management apparatus 100 and the control apparatus 110 according to the embodiment.

The color management apparatus 100 and the control apparatus 110 include a color inspection print job specification setting module 401, a UI control module 402, a color inspection job generation module 403, a measurement job generation module 404, a measurement control module 405, a color inspection processing module 406. Each of these functional modules is realized by the CPU 101 executing a predetermined program. Each functional unit will be described below.

The color inspection print job specification setting module 401 sets a specification of a color inspection print job. Specifically, the color inspection print job specification setting module 401 performs settings for a measuring device to be used for measuring a chart, a color inspection specification, and the like, in addition to a condition of a printer that is a target of color inspection and a sheet used in the print job. Since the color reproduction accuracy of a printer changes greatly depending on the combination of a printer and a sheet, it is necessary to perform color inspection and color management for each condition of a printer and a sheet. Here, the color inspection print job specification setting module 401 selects from among the printers 130*a*, 130*b*, and 130*c* connected to the control apparatus 110 a printer that performs color inspection and sets the printer to be inspected. In addition, the color inspection print job specification setting module 401 sets a predefined sheet or selects a sheet from sheets in the device information of the set printer received via the control apparatus 110 and sets the sheet.

In addition, a chart design specification, such as a measurable patch size, a patch arrangement with consideration for margin, and specification of markers for recognizing patch arrangement, are defined according to the measuring device. Therefore, in order to generate a measurable chart and print it by the printer, it is necessary to designate the measuring device to be used. Therefore, the color inspection print job specification setting module 401 selects and sets a predefined type of measuring device or selects a measuring device to be used for color inspection from the measuring devices 150*a*, 150*b*, and 150*c* connected to the control apparatus 110.

The color inspection print job specification setting module 401 performs advanced settings for a color inspection specification (chart specification (number of patches, patch signal value, etc.), reference value set, allowable value set, evaluation mode, a measurement condition, a print condition, etc.) necessary for color inspection processing.

The chart specifications for when performing color inspection can be roughly divided into predetermined charts according to standards, such as International Standard Organization (ISO), and custom charts uniquely defined by the user. The predetermined charts are pre-registered prior to the start of use, for example, when a color management program is installed. Regarding the custom charts, upon accepting input of custom chart information from the console unit 106, the color inspection print job specification setting module 401 performs settings at an appropriate timing.

In addition, regarding the reference value set, allowable value set, evaluation mode, measurement condition, and print condition for when performing color inspection, conditions defined by Japan Color Certification, and the like, which comply with ISO, are set. An allowable value is a threshold used when comparing a color (reference color) serving as a defined reference with a color (printed color) for when printing is actually performed by the printer and confirming that the color accuracy of the printed color satisfies the passing criteria. For example, when determination is to be made based on a difference (color difference) between a color value (reference value) of the reference color and a color value (measured value) of the printed color, a color difference value is registered as an allowable value, and if the difference is within the allowable value, it is determined that the color accuracy of the printed color satisfies the passing criteria.

In addition, when performing color inspection, the color inspection is started by the color inspection job generation module 403 to be described later generating a color inspection job upon receiving selection of a specification of a color inspection print job set in the color inspection print job specification setting module 401 and an inspection start instruction.

The UI control module 402 performs display control of a user interface screen for confirming the status of each apparatus in the color management system, inputting or selecting various setting values, and accepting an instruction to start various kinds of processing, and the like. The user interface screen to be displayed will be described later with reference to FIG. 5AA to FIG. 5DB.

The color inspection job generation module 403 selects one or more specifications of a color inspection print job set in the color inspection print job specification setting module 401 and, upon accepting an inspection start instruction, generates the color inspection job. When a plurality of color inspection print job specifications are selected and an inspection start instruction is accepted, the color inspection job generation module 403 issues a color inspection job for each color inspection print job specification. The color inspection job generation module 403 issues a color inspection job ID for each generated color inspection job.

The color inspection job generation module 403 generates a chart based on the chart specification, the measuring device that supports the selected color inspection print job specification, and the like, and transmits the chart to the control apparatus 110. At this time, the color inspection job generation module 403 adds a color inspection job ID to the chart. In the embodiment, regarding the color inspection job ID, there are two types: a four-digit ID, which is repeatedly used within a short period of time and is for visual confirmation by a person and a 32-digit ID for system management by the color management apparatus 100, but the color inspection job ID is not limited thereto. Then, the color inspection chart is printed via the control apparatus 110 by a printer set in the specification of a color inspection print job.

The measurement job generation module 404 accepts the selection of one or more measurement target color inspection jobs and a measurement start instruction and generates a measurement job. At this time, the measurement job generation module 404 adds information indicating that it is a measurement job for which measurement is to be performed collectively with a plurality of jobs to the measurement target color inspection job.

In the embodiment, when a plurality of color inspection jobs issued by the color inspection job generation module 403 are designated or selected and a measurement start instruction is accepted, the measurement job generation module 404 generates one measurement job. At this time, the measurement job generation module 404 issues a measurement job ID (e.g., five digits) to the one generated measurement job. The method of generating a measurement job is only one example and is not limited thereto. For example, the same number of measurement jobs as the color inspection job may be issued, and a batch measurement ID or the like indicating that the measurement jobs are to be executed collectively may be issued separately.

The measurement control module 405 executes measurement of a chart using a measuring device. Some types of measuring devices can pre-scan a chart using a sensor mounted in the measuring device and perform, for example, automatic recognition of measurement target patches. The measurement control module 405 transmits a measurement result received from the measuring device to the color inspection processing module 406.

The color inspection processing module 406 performs processing for inspecting whether the color accuracy of the target printer has reached the passing criteria, using the measurement data received from the measurement control module 405.

Figure 5A:
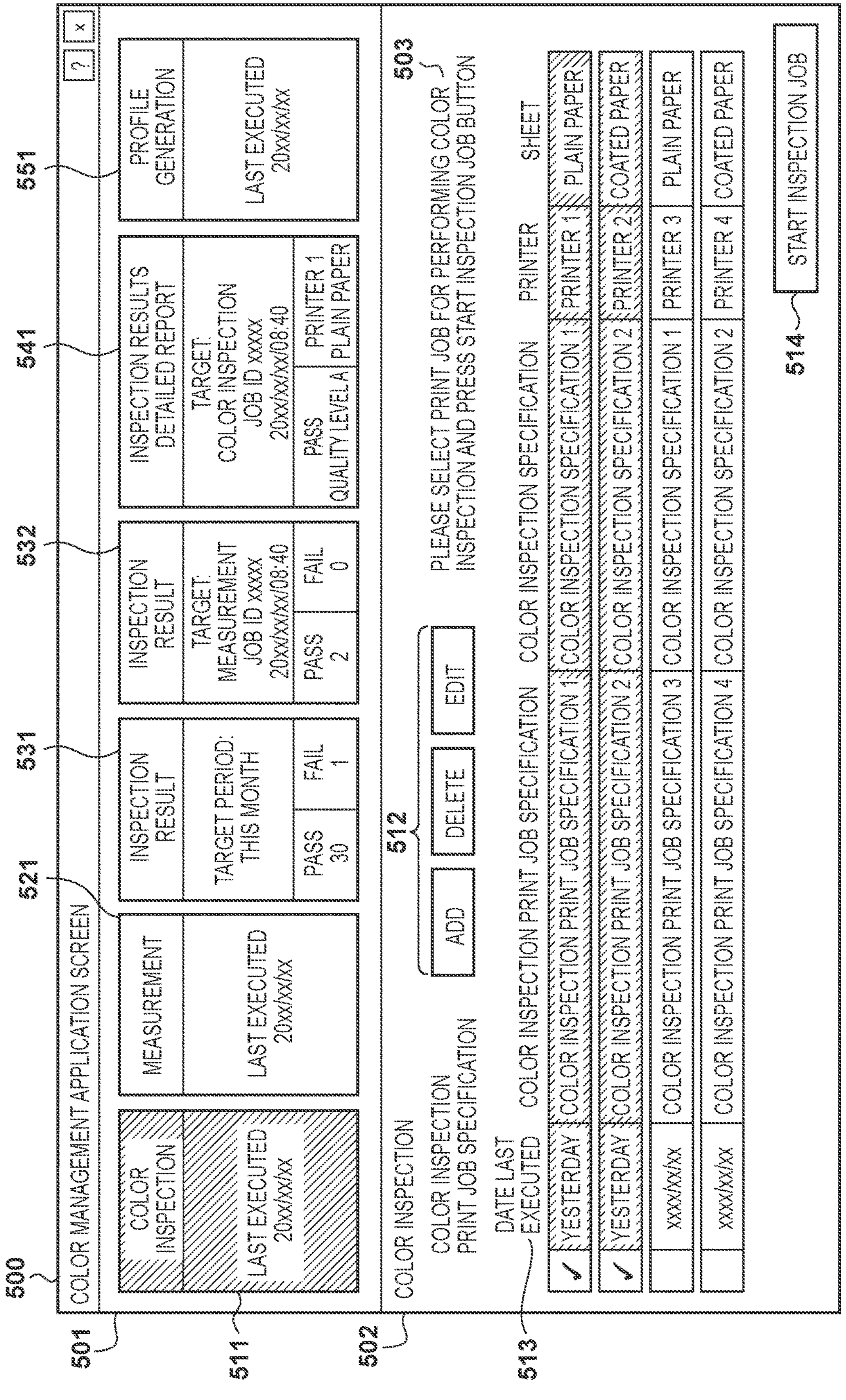
FIGS. 5AA and 5AB are diagrams illustrating examples of an operation screen to be displayed on a display unit by the color management apparatus according to the embodiment.
Figure 5A:
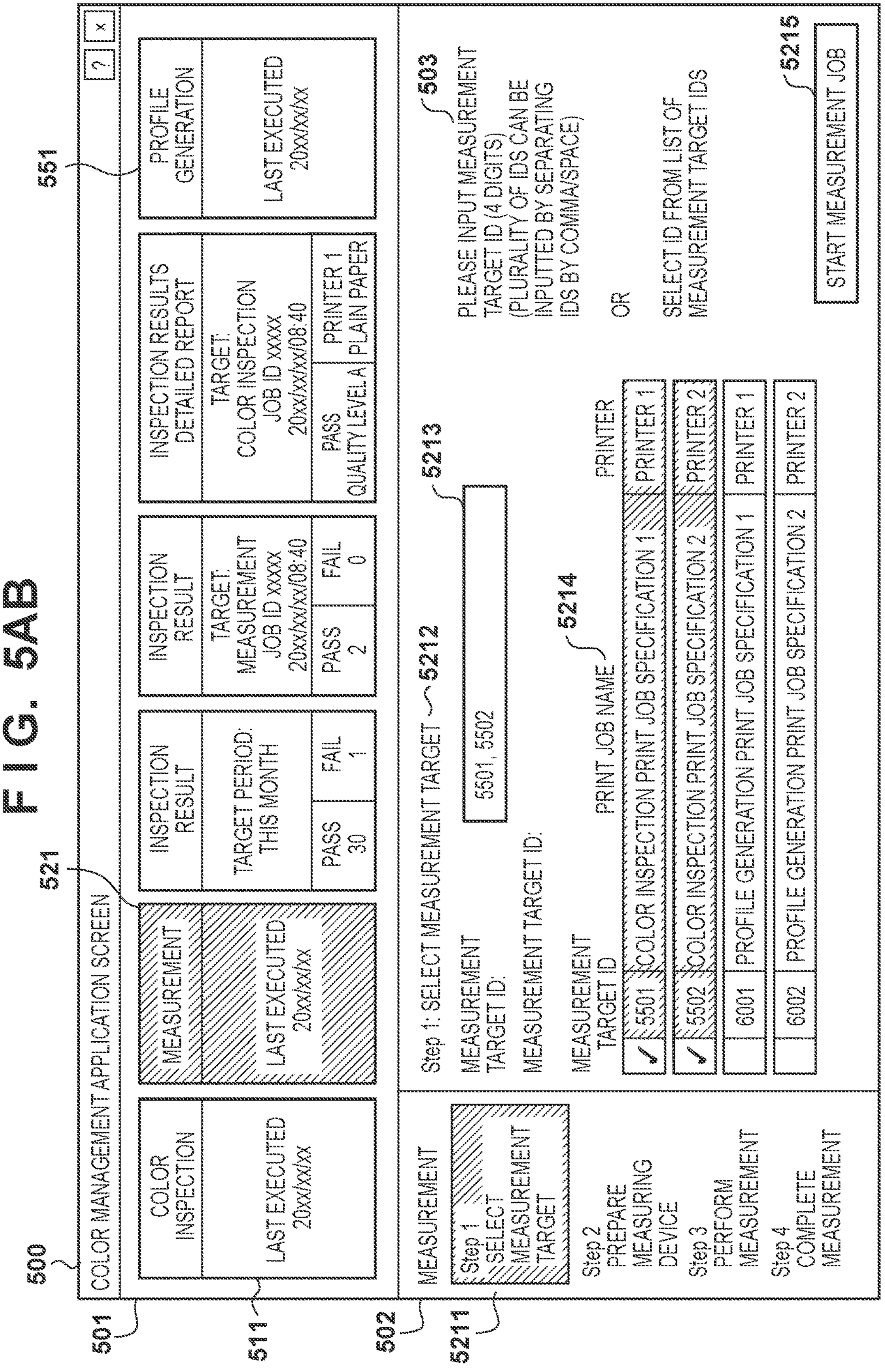

FIGS. 5AA and 5DB are diagrams illustrating examples of an operation screen 500 to be displayed on a display unit 105 by the color management apparatus 100 according to the embodiment.

The operation screen 500 includes a function card display area 501 for displaying function cards used for color management and a function display area 502 for displaying functions of a card currently selected in the function card display area 501.

First, an overview of functions available from each function card displayed in the function card display area 501 will be described. In addition, assume that function cards, such as an inspection result function card 531 and an inspection results detailed report function card 541, can be started and displayed a plurality of times if the contents of the card are based on different conditions.

FIG. 5AA illustrates a state in which a color inspection function card 511 is selected, and, in this state, the UI control module 402 has a function of performing settings for a specification of a color inspection job and starting the color inspection job and displays digest information, such as information on a date and time at which a color inspection job was last executed, on the color inspection function card 511.

In a measurement function card 521, the UI control module 402 has a function of starting a measurement job, preparing a measuring device, performing measurement, transmitting a measurement result, and the like, and displays digest information, such as information on a date and time at which a measurement job was last executed, on the measurement function card 521. In the embodiment, in the measurement function, the measurement job generation module 404 collectively generates a plurality of measurement target jobs (color inspection jobs) as one measurement job. The measurement control module 405 is characterized in that measurement results are notified starting from that of a measurement target job (color inspection job) for which measurement has been completed.

In the inspection result function card 531, the color management apparatus 100 has a function of unitarily managing color inspection results of printers, and the UI control module 402 has a function of filtering for a designated target period. The UI control module 402 displays the filtered inspection result digest on the inspection result function card 531. In the embodiment, as illustrated in an inspection result function card 532, one of the features is that when a plurality of color inspection jobs are performed in one measurement job, it is possible to display a function card that can display only inspection results (number of passes/fails) of measurement targets. In the embodiment, the UI control module 402 realizes that by filtering inspection results for a measurement job ID and limiting display content. However, the present invention is not limited thereto.

In the inspection results detailed report function card 541, the UI control module 402 has a function of displaying a detailed report of inspection results of color inspection jobs and displays digest information, such as an inspection result, a quality level, a target printer, and a sheet, on the inspection results detailed report function card 541.

In a profile generation function card 551, the UI control module 402 has a function of setting a specification of a profile generation job to be used, for example, when the color inspection fails, and starting the profile generation job. The UI control module 402 displays digest information, such as information on the date and time at which the profile generation job was last executed, on the profile generation function card 551.

Next, an overview of a color inspection function screen displayed in the function display area 502 will be described with reference to FIG. 5AA. An operation explanation area 503 displays a method of operating a function screen currently being displayed. In FIG. 5AA, explanation of selection of a print job for performing color inspection and an inspection job start operation is indicated.

Regarding add, delete, and edit buttons 512 for a specification of a color inspection print job, a specification of a color inspection print job can be added, deleted, and edited in a color inspection print job specification list 513. In addition, by pressing a start inspection job button 514 while one or more color inspection print job specifications are selected in the color inspection print job specification list 513, a color inspection job can be started according to the selected color inspection print job specifications.

Next, an overview of a screen for a function of advanced settings for a specification of a color inspection print job will be described with reference to FIG. 5AA to FIG. 6.

Figure 6:
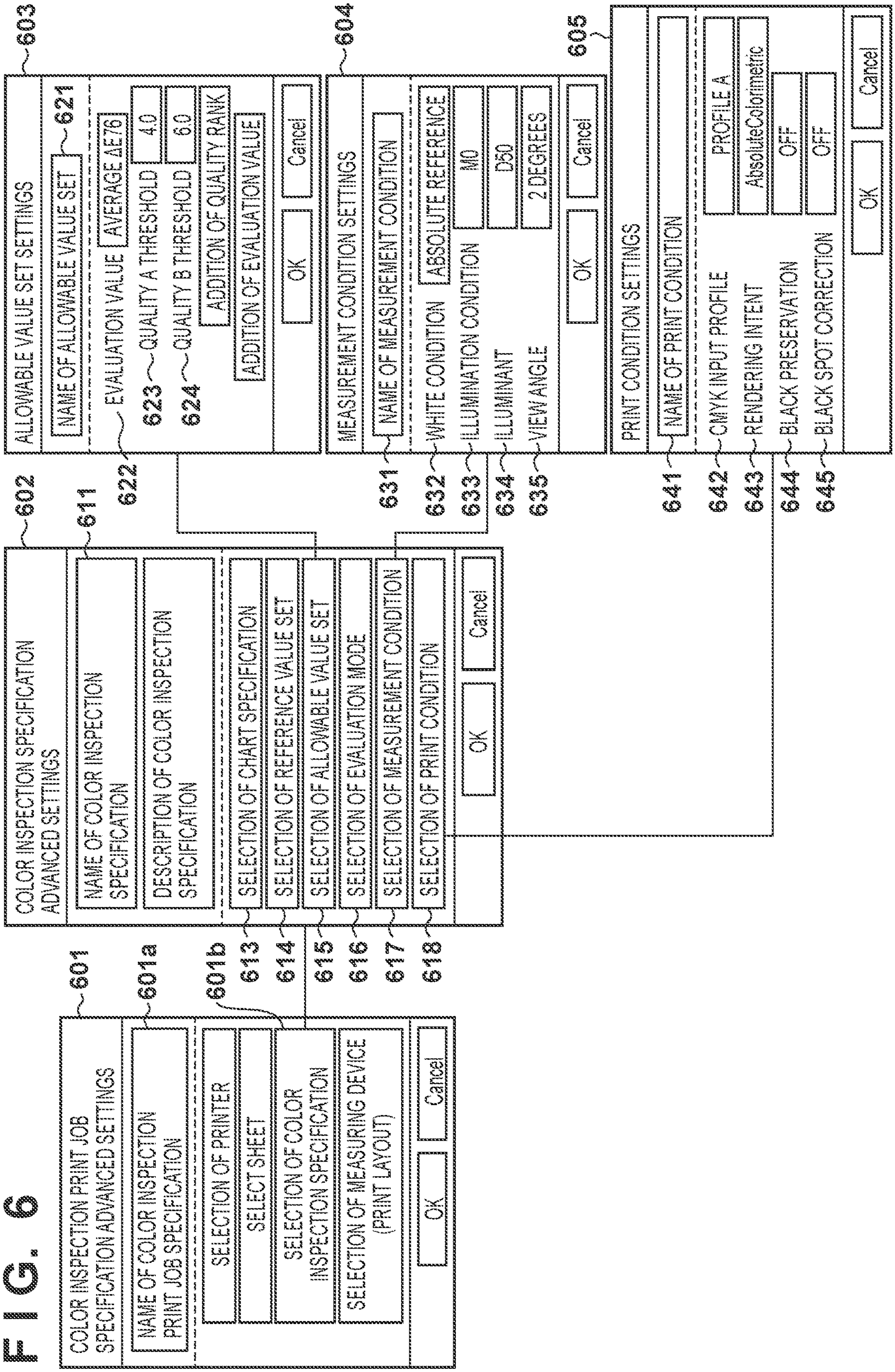
FIG. 6 is a diagram for describing transition of a screen for a function for advanced settings of the specification of a color inspection print job according to the embodiment.

FIG. 6 is a diagram for describing transition of a screen for a function for advanced settings of the specification of a color inspection print job according to the embodiment.

Upon accepting a press of the add/edit button 512 for a color inspection print job specification on the screen of FIG. 5AA, the UI control module 402 transitions to a color inspection print job specification advanced setting screen indicated by a reference numeral 601 of FIG. 6.

In the color inspection print job specification advanced setting screen 601, the UI control module 402 accepts selection of a color inspection specification indicating a color inspection method, measuring device information related to a print layout of a chart, and the like, in addition to a condition of a printer for which it is desired to perform color inspection and a sheet to be used for the color inspection. Regarding the various kinds of settings accepted from the UI control module 402, the color inspection print job specification setting module 401 registers the color inspection print job specification under a name designated by a "name of color inspection print job specification" 601*a*. In "selection of color inspection specification" 601*b*, assume that addition, deletion, and editing can be performed using a menu (not illustrated), and, upon accepting an add/edit instruction, the UI control module 402 transitions to a color inspection specification advanced setting screen 602.

In the color inspection specification advanced setting screen 602, "selection of chart specification" 613 to be used for color inspection, "selection of reference value set" 614 and "selection of allowable value set" 615 corresponding to the chart, "selection of evaluation mode" 616 in the color inspection processing, "selection of measurement condition" 617 of the chart, "selection of print condition" 618, and the like, are accepted. Regarding the various kinds of settings accepted from the UI control module 402, the color inspection print job specification setting module 401 registers the color inspection specification under a name designated by a "name of color inspection specification" 611. In the setting of each item of the color inspection specification, it is possible to add, delete, and edit using a menu (not illustrated). Upon accepting the add/edit instruction, the UI control module 402 transitions to a respective advanced setting screen as illustrated in, for example, an allowable value set setting screen 603, a measurement condition setting screen 604, and a print condition setting screen 605 of FIG. 6.

When the "selection of allowable value set" 614 is accepted, the allowable value setting screen 603 is transitioned to, and regarding the various kinds of settings accepted from the UI control module 402, the color inspection print job specification setting module 401 registers the setting of the allowable value set under a name designated by a "name of allowable value set" 621. The UI control module 402 accepts settings, for example, for an evaluation value 622 and quality rank/pass or fail determination threshold setting 623 and 624 for when the evaluation value is used. Assume that a plurality of types of evaluation values and quality ranks can be set. For example, if the evaluation value setting is an average ΔE76, the color inspection processing module 406 calculates a value obtained by calculating for each patch a linear distance (Equation (1)) between a reference color value (value selected by the selection 614 of the reference value set) in the L*a*b* color space and a measured value obtained by measuring the chart and then taking an average. Then, a comparison is performed with a threshold setting 623 or 624 according to the quality rank. In the example of FIG. 6, if the value of the average ΔE76 is less than or equal to "4", a quality rank A is assumed. If it is less than or equal to "6", a quality rank B is assumed, and if it is a value greater than a set threshold "6", fail is assumed. The method of determining pass/fail is not limited to this, and the UI control module 402 may allow quality ranks at which pass is determined to be separately set from a setting UI (not illustrated). For example, by setting pass determination to be the quality rank A, it may be determined pass only when the threshold of the quality rank A is satisfied.

$$\Delta E = \sqrt{\{\Delta L^2 + \Delta a^2 + \Delta b^2\}} \quad \text{Equation (1)}$$

$$\text{where } \Delta L = L1 - L2,\ \Delta a = a1 - a2,\ \Delta b = b1 - b2$$

When the "selection of measurement condition" 617 of the chart is accepted, the measurement condition setting screen 604 is transitioned to, and regarding the various kinds of settings accepted from the UI control module 402, the color inspection print job specification setting module 401 registers the setting of the measurement condition under a name designated by a "name of measurement condition" 631. The UI control module 402 accepts the settings of a white condition 632, an illumination condition 633, an illuminant 634, a view angle 635, and the like, but is not limited thereto. Regarding the white condition 632, there are a "paper-white white reference" based on the white background of actual printing paper or an "absolute white reference" based on a white reference plate (white tile) of the measuring device, and therefore, either is selected. The illumination condition 633 represents "M0", "M1", "M2", or "M3" specified in ISO 13655, and one is selected. Regarding the illuminant (observation light source) 634, a type of incorporated light source data for when calculating L*a*b* is selected. Examples of the type include "A", "D50" "D65", and the like. The view angle 635 relates to a view angle (size of object) when a person views an object, and a selection is made from "2-degree field of view", "10-degree field of view", and the like, which are specified in ISO.

When the "selection of print condition" 618 is accepted, the print condition setting screen 605 is transitioned to, and regarding the various kinds of settings accepted from the UI control module 402, the color inspection print job specification setting module 401 registers the setting of the print condition under a name designated by a "name of print condition" 641. The UI control module 402 accepts the settings of a CMYK input profile 642, a rendering intent 643, black preservation 644, black spot correction 645, and the like, but is not limited thereto. When an RGB image is selected in the "selection of chart specification" 613 in the screen 602, the setting of an RGB input profile may be accepted, or the device information of the printer may be obtained and the setting items to be accepted via the screen 605 may be changed accordingly. Since these color inspection specifications are the specification settings of a target of color inspection, they are to be customized and set as appropriate according to the use case and are not limited to those described above.

In addition, the color inspection specifications are predetermined according to the type of standard certification when performing color inspection according to Japan Color certification and Fogra certification, which conform to ISO international standards. For example, the "selection of measurement condition" 617 is as illustrated in FIG. 10A.

FIG. 10A is a diagram illustrating an example of a measurement condition set on the measurement condition setting screen 604.

For example, the "selection of allowable value set" 615 is as illustrated in FIG. 10B. FIG. 10B is a diagram illustrating an example of an allowable value set on the allowable value setting screen 603.

In addition to this, settings for the "selection of print condition" 618, and the like, are also predefined, including the profile to be used. Therefore, it is assumed that the color inspection print job specification setting module 401 holds in advance the color inspection specification settings corresponding to the standard certifications.

Next, an overview of a measurement function screen displayed in the function display area 502 will be described with reference to FIG. 5AB. The function display area 502 in the measurement function includes an area 5211 for displaying all operation steps in the measurement function and a current operation step item area 5212 for displaying the current operation step item. Regarding the respective operation steps Step 1 to Step 4 displayed in the area 5211 for displaying all operation steps in the measurement function, an overview will be described with reference to FIGS. 5AB to 5DA. The UI control module 402 displays the current operation step in an emphasized manner in the area 5211 for displaying the operation steps of the measurement function.

FIG. 5AB illustrates a measurement target selection step of Step 1. In the measurement target selection step, the UI control module 402 accepts the designation of a measurement target ID number assigned to the chart from a text box 5213. Here, it is also possible to collectively accept the designation of a plurality of measurement target IDs by using a separating character. Alternatively, the UI control module 402 accepts selection of one or more measurement target IDs from a list 5214 of print jobs that require chart measurement issued from the color inspection function corresponding to the color inspection function card 511 or the profile generation function corresponding to the profile generation function card 551. The UI control module 402 may interlock the text box 5213 and the print job list 5214 with each other to display selected measurement target ID information. In FIG. 5AB, the IDs (5501,5502) of color inspection print job specifications 1 and 2 are inputted into the text box 5213, and color inspection print job specifications 1 and 2 are designated as measurement targets.

Then, upon accepting a press of a start measurement job button 5215 for the selected measurement target IDs or designation from the UI control module 402, the measurement job generation module 404 starts the measurement job. In the embodiment, in the measurement target selection step, one of the features is that the measurement job generation module 404 can start the measurement job in a state in which a plurality of measurement target print jobs have been collectively accepted in one measurement job. In the embodiment, print jobs to be assigned measurement targets are not limited to color inspection print jobs but need only print jobs in which measurement of a chart is necessary, such as profile generation print jobs.

Figure 5B:
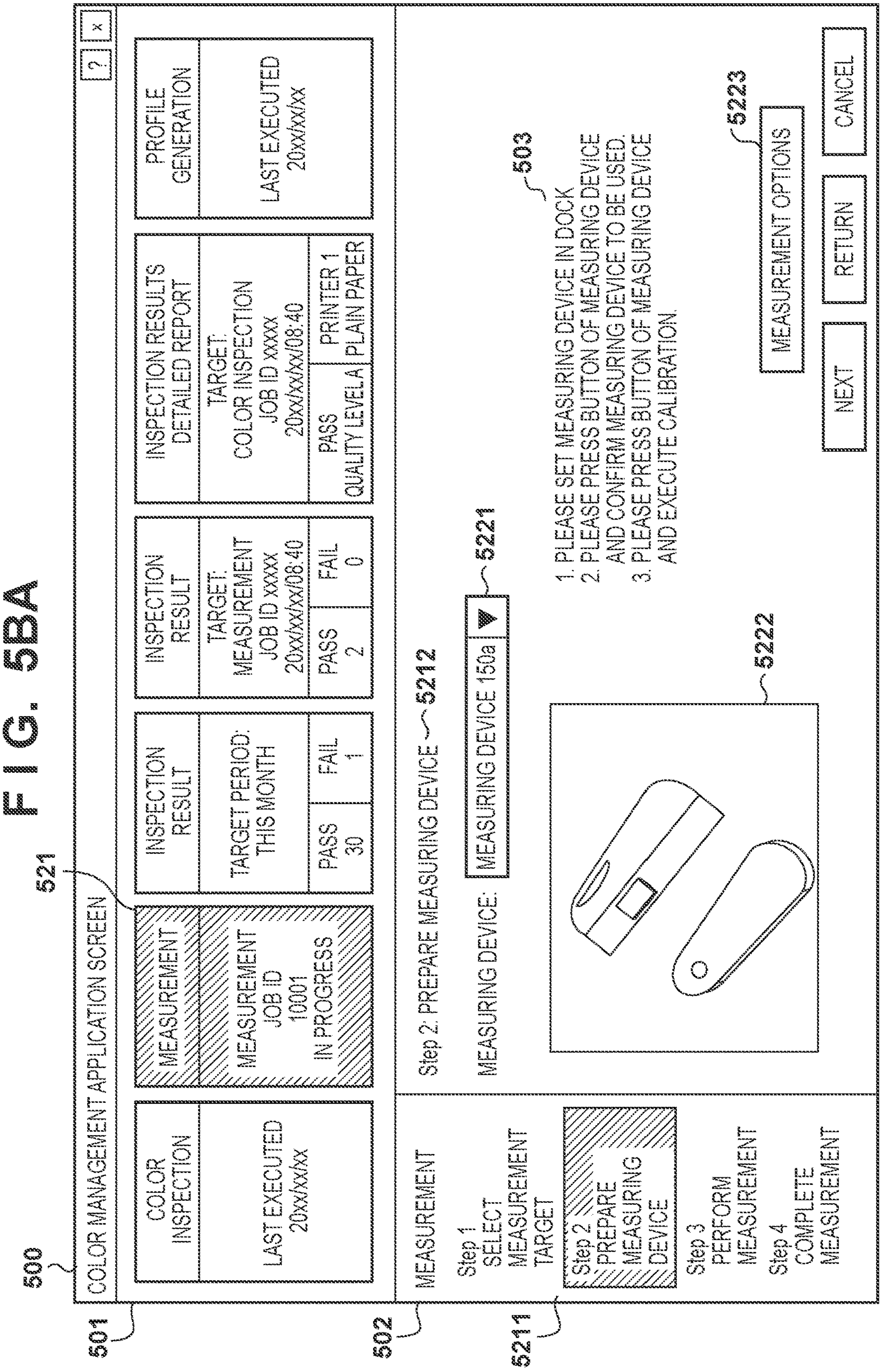
FIGS. 5BA and 5BB are diagrams illustrating examples of the operation screen to be displayed on the display unit by the color management apparatus according to the embodiment.
Figure 5B:
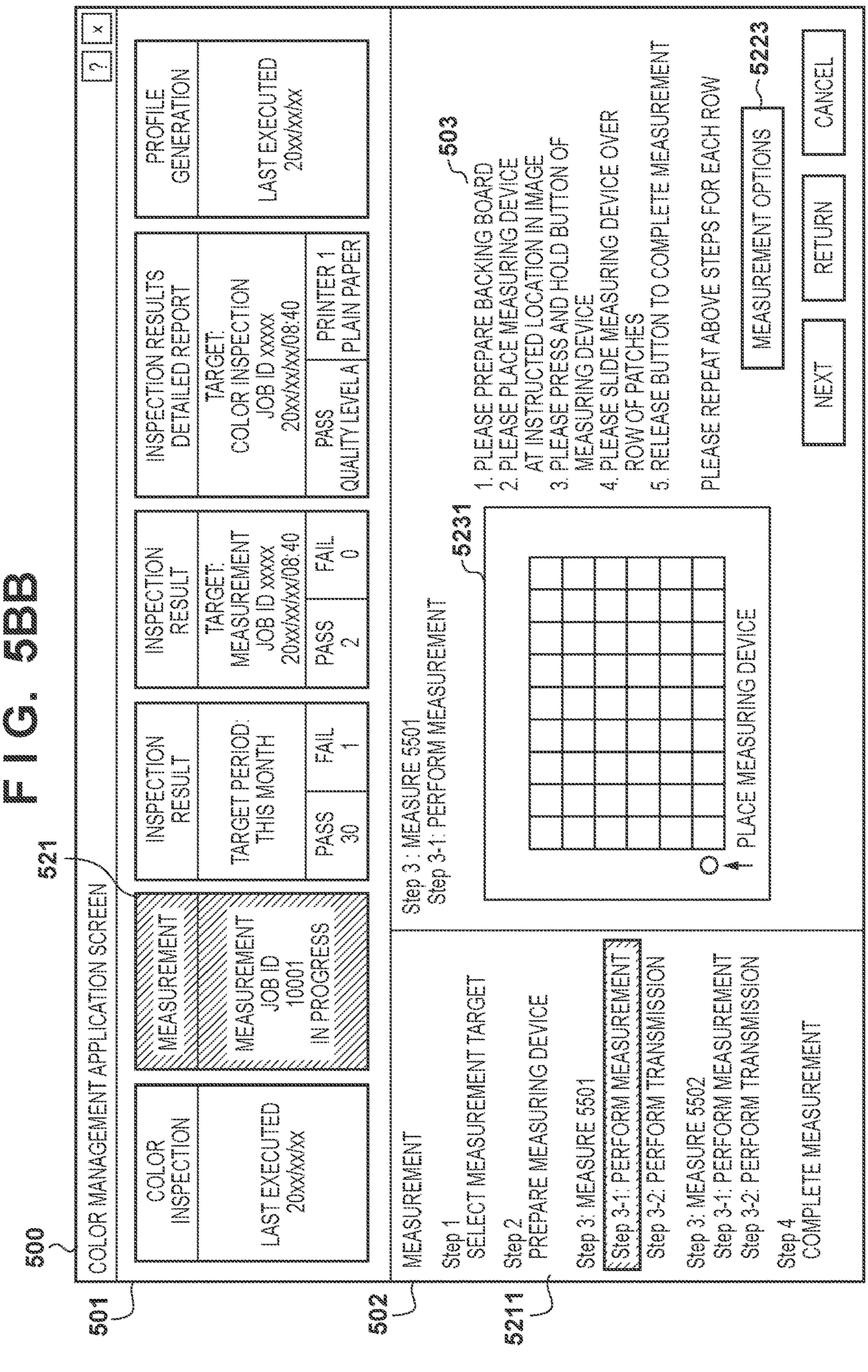

FIG. 5BA illustrates a measuring device preparation step of Step 2. In the measuring device preparation step, the UI control module 402 displays a measurement job ID currently being executed by the measurement function card 521. Based on the measuring device information included in the measurement target print job specification settings, a name 5221 (here, the measuring device 150*a*) of a corresponding measuring device from among the measuring devices connected to the control apparatus 110 and an illustration 5222 thereof are displayed. When a plurality of measuring devices of the same type are connected, the names 5221 are displayed in a list.

Upon accepting the designation of the measuring device by the name 5221 from the UI control module 402, the measurement control module 405 makes a connection request to the target measuring device and performs, for example, calibration of the measuring device. In this way, matters related to the measuring device are prepared. Assume that the measuring device preparation step is only one example and changes according to the specifications of the measuring device. At this time, in the operation explanation area 503, an explanation for an initial operation for the designated measuring device is displayed.

Figure 5C:
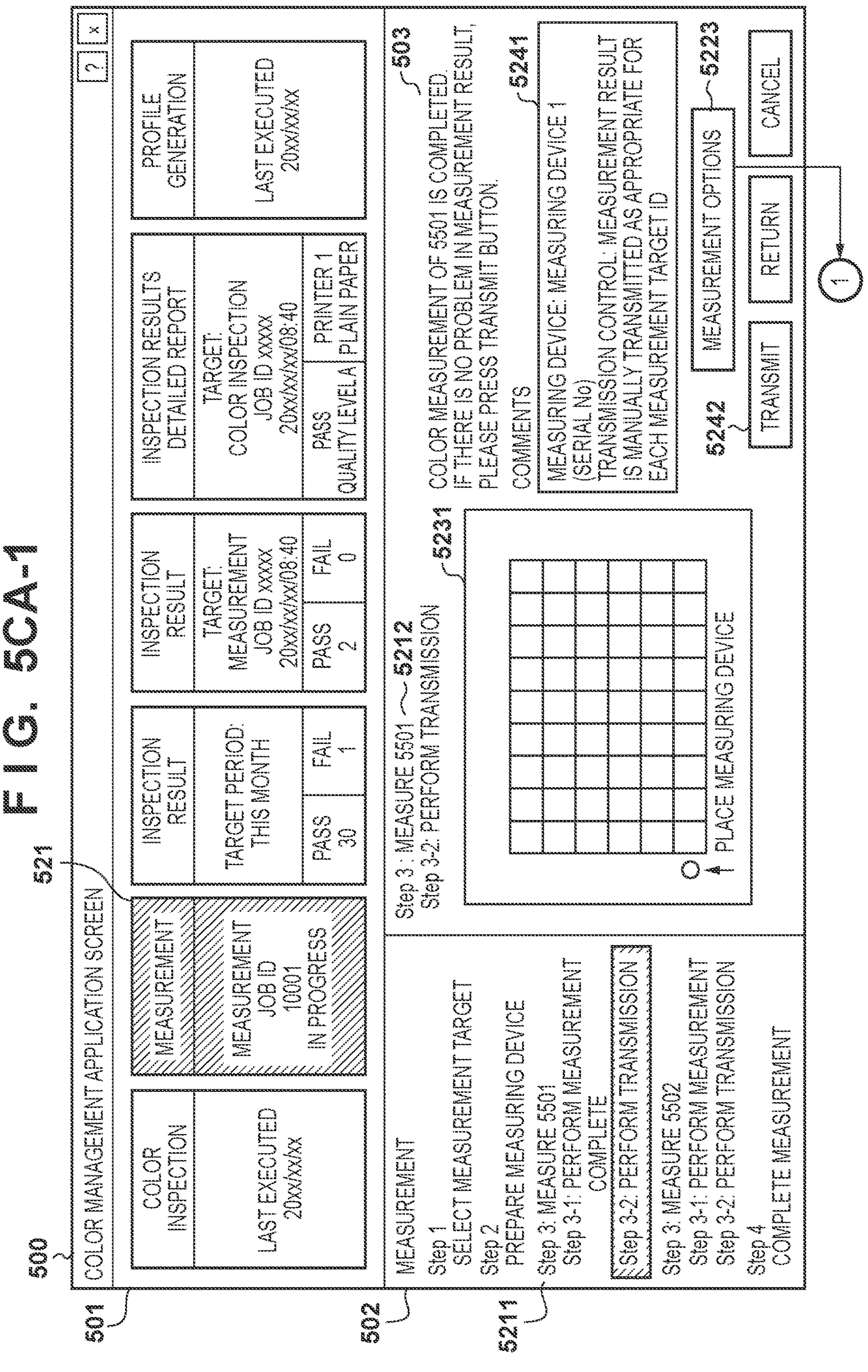
FIGS. 5CA-1, 5CA-2 and 5CB are diagrams illustrating examples of the operation screen to be displayed on a display unit by the color management apparatus according to the embodiment.
Figure 5C:
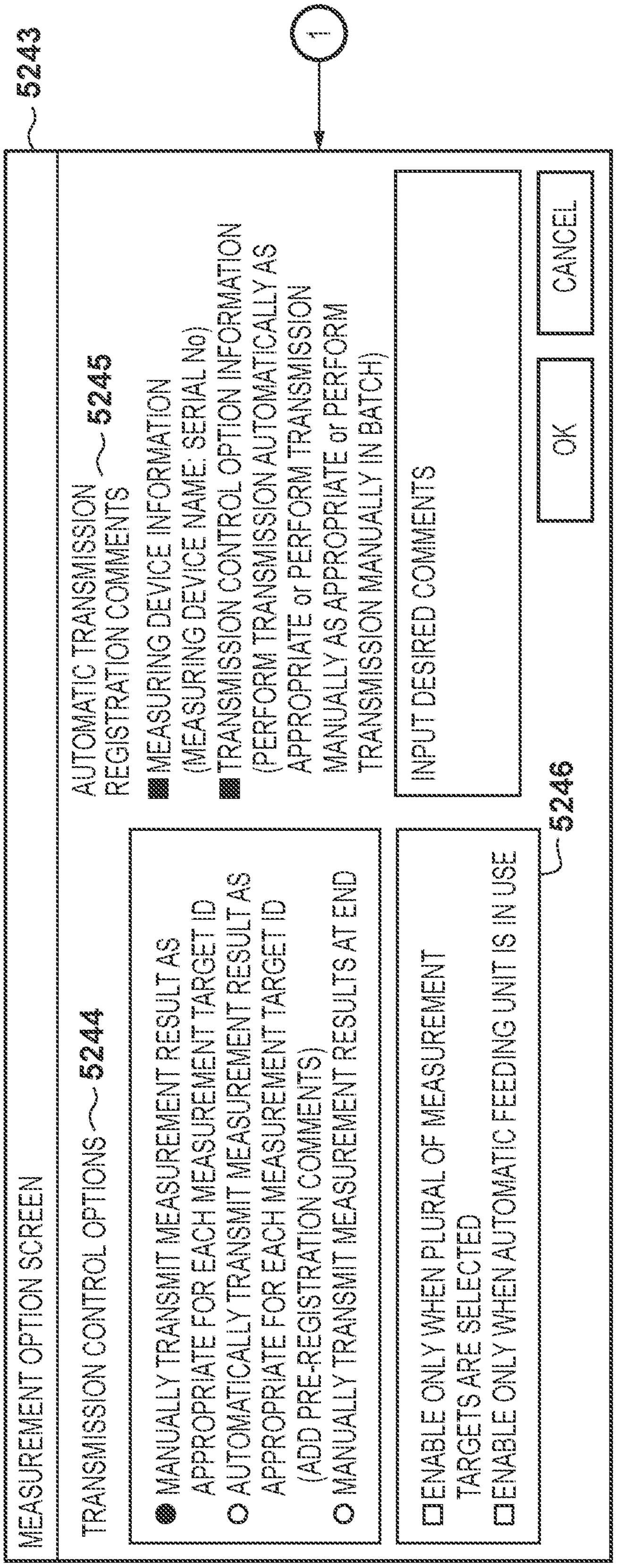
Figure 5C:
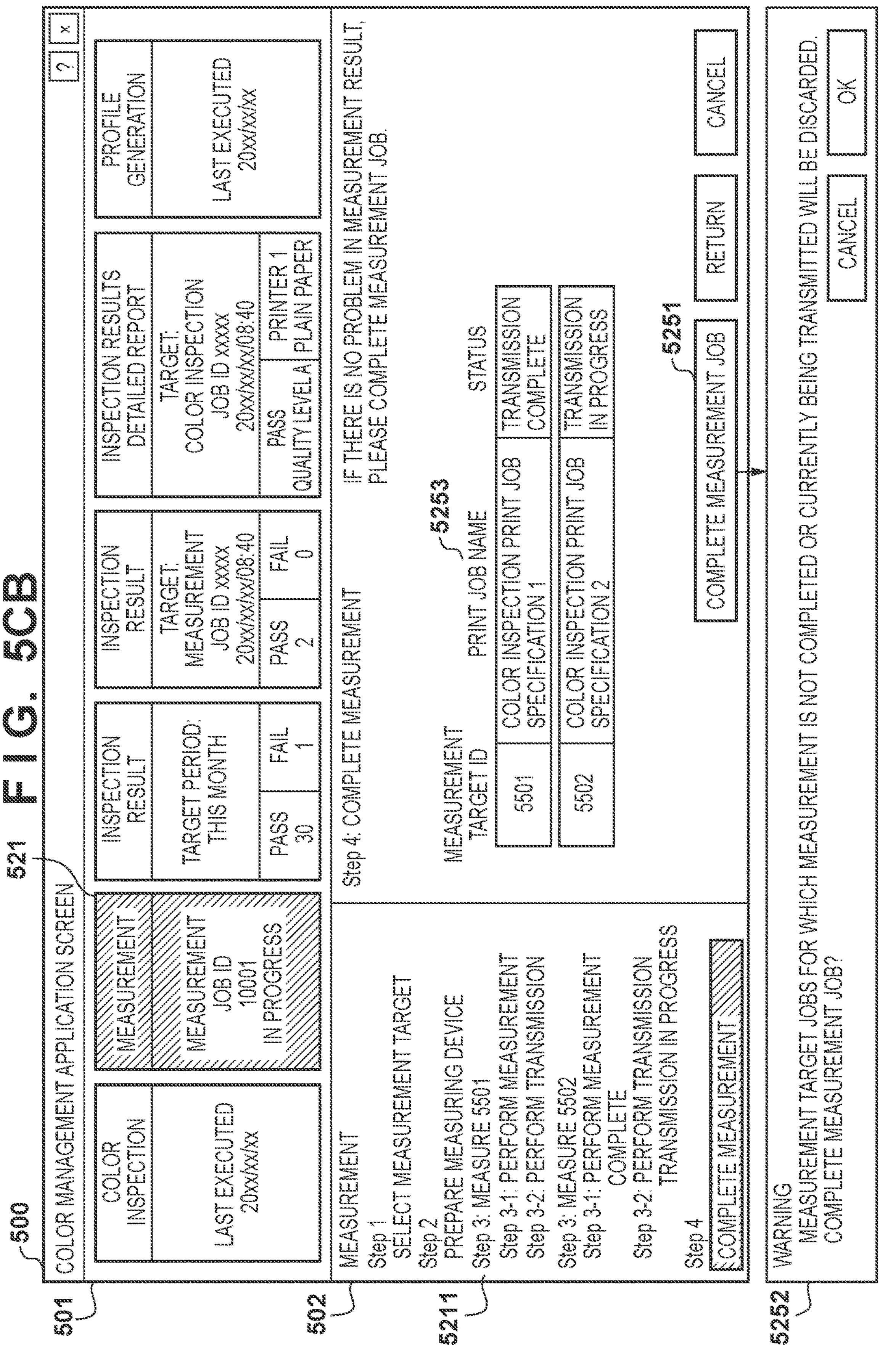

In the measurement function in the measurement function card 521, the UI control module 402 can accept option settings for performing control switching in the measurement function from a measurement options button 5223. Details of a measurement option function related to the features according to the embodiments will be described later. In the embodiment, depending on the measurement function operation steps, Step 1 to Step 4, the measurement options button may not be displayed as shown in FIG. 5CB but is not limited thereto. For example, the measurement options button 5223 may be displayed in all operation steps of the measurement function.

FIG. 5BB illustrates a measurement step of Step 3. In the embodiment, one of the features of the embodiment is that, when there are a plurality of measurement target print jobs as indicated by the area 5211 for displaying all operation steps in the measurement function, the UI control module 402 generates Step 3 for each measurement target print job ID. In addition, the measurement step of Step 3 is divided in to two sub-steps, a measurement step of Step 3-1 and a transmission step of Step 3-2, according to the settings of the measurement options to be described later. When there is one measurement target print job, the sub-step for measurement result transmission is not provided, and the measurement result is transmitted at the same time as the measurement completion of Step 4.

FIG. 5BB illustrates the measurement step of Step 3-1, and the UI control module 402 displays a measurement target chart 5231. Then, the measurement control module 405 performs mutual communication with the measuring device designated in Step 2 of FIG. 5BA and measures patches. Assume that the measurement method is only one example and changes according to the specifications of the measuring device.

In the embodiment, one of the features of the embodiment is that by generating the measurement step of Step 3 for each measurement target print job ID, and the step numbers (1-3 in FIG. 5BB) of the measurement steps are assigned regardless of the number of measurement target print jobs. Thus, the step numbers can be unified regardless of the number of measurement target print jobs, allowing easy-to-understand writing in the manual.

In the embodiment, one of the features of the embodiment is that since the measurement step of Step 3 is divided for each measurement target print job ID, the UI control module 402 performs notation by which an operation status (not completed or completed, etc.) of Step 3 can be determined as in FIG. 5CA-1 in the area 5211 for displaying all operation steps.

FIGS. 5CA-1 and 5CA-2 illustrate the transmission step of Step 3-2. Upon accepting the patch measurement completion of a respective measurement target print job from the measurement control module 405, the UI control module 402 automatically displays the transmission step of Step 3-2.

In the transmission step of Step 3-2, the current operation step item area 5212 includes a comment field 5241 for the measurement target print job. Upon accepting a press of a transmit button 5242 from the UI control module 402, the measurement control module 405 transmits a measurement job ID, a color inspection job ID, information of the comment field 5241, a patch measurement result, and the like, to the color inspection processing module 406.

In the transmission step of Step 3-2, the UI control module 402 performs screen transition to the next measurement target print job without waiting for a transmission completion notification for the measurement target print job for which transmission has been executed and enters a state in which the measurement control module 405 can perform measurement. This is also one of the features of the embodiment.

Thus, one of the features of the embodiment is that the patch measurement result can be transmitted without waiting for completion of measurement of all measurement target print jobs. In the embodiment, the patch measurement result is transmitted in units of measurement target print job IDs but it is not limited thereto. It need only be that the patch measurement result can transmitted to the color inspection processing module 406 in units such that the color inspection processing, which is a subsequent process, can be started without waiting for completion of measurement of all measurement target print jobs. Although the color inspection processing has been given as an example of a subsequent process, the present invention is not limited thereto, and the subsequent process may be printer profile generation processing.

Depending on the use case, a transmission control switching setting, which has good work efficiency, may be provided. For example, in the embodiment, a measurement option screen 5243, which is activated upon receiving a press of the measurement options 5223 from the UI control module 402, is provided.

One of the features of the embodiment is that upon receiving the setting via the measurement option screen 5243 of FIG. 5CA-2, the UI control module 402 and the measurement control module 405 can switch screen control and transmission control. Next, transmission control options 5244 and automatic transmission registration comments 5245 included in the measurement option screen 5243 will be described in detail.

When a setting of “manually transmit measurement result as appropriate for each measurement target ID” is accepted in the transmission control options 5244, the UI control module 402 divides the measurement step of Step 3 into two sub-steps, the measurement step of Step 3-1 and the transmission step of Step 3-2, for each measurement target ID. The measurement control module 405 accepts a press of the transmit button 5242 from the UI control module 402 in the transmission step of Step 3-2 for each measurement target ID. Upon accepting a press of the transmit button 5242, the measurement control module 405 transmits a measurement job ID, a color inspection job ID, information of the comment field 5241, a patch measurement result, and the like, that are associated with the measurement target ID to the color inspection processing module 406.

When a setting of “automatically transmit measurement result as appropriate for each measurement target ID” is accepted in the transmission control options 5244, the UI control module 402 does not provide sub-steps in the measurement step of Step 3. Upon accepting the patch measurement completion for a respective measurement target ID, the measurement control module 405 automatically transmits a measurement job ID, a color inspection job ID, comment information based on the automatic transmission registration comments 5245, a patch measurement result, and the like, to the color inspection processing module 406 as appropriate.

When a setting of "manually transmit measurement results at end" is accepted in the transmission control options 5244, the UI control module 402 does not provide sub-steps in the measurement step of Step 3. The measurement control module 405 does not transmit a measurement result for each measurement target ID.

A configuration in which the above transmission control options 5244 can be set differently depending on a measurement function usage condition 5246, such as "enable only when plural measurement targets are selected" or "enable only when automatic feeding unit is in use", may be taken. As illustrated in FIGS. 5CA-1 and 5CA-2, a switch setting may be provided on the UI, or the UI control module 402 may be configured to automatically determine whether the measuring device is manual feeding or automatic feeding or automatically determine whether there is one or more measurement target IDs and hold settings under respective conditions.

Next, the automatic transmission registration comments 5245 will be described. The automatic transmission registration comments 5245 describes a function related to comments that are automatically added when the measurement control module 405 automatically transmits the measurement result of a measurement target ID to the color inspection processing module 406. It is assumed that measuring device information, transmission control option information, and desired comments can be selected and registered but are not limited thereto, and one of the features of the embodiment is that a setting for automatically obtaining and adding information to be to be confirmed in the operation step related to the measurement function is provided. In FIG. 5CA-1, the measuring device information and the transmission control option information are selected using check-boxes.

Next, a measurement completion step of Step 4 will be described with reference to FIG. 5CB and FIG. 5DA.

The measurement completion step illustrated in FIG. 5CB illustrates a case when the UI control module 402 accepts, in the transmission control options 5244, a setting for manually or automatically transmitting the measurement result "as appropriate" for each measurement target ID. At this time, the comment field 5241 (FIG. 5CA-1) for the measurement target ID is not displayed. In FIG. 5CB, the color inspection print job specification 1 is completed, the measurement processing for the color inspection print job specification 2 is completed, and the transmission processing for the color inspection print job specification 2 is being executed.

Figure 5D:
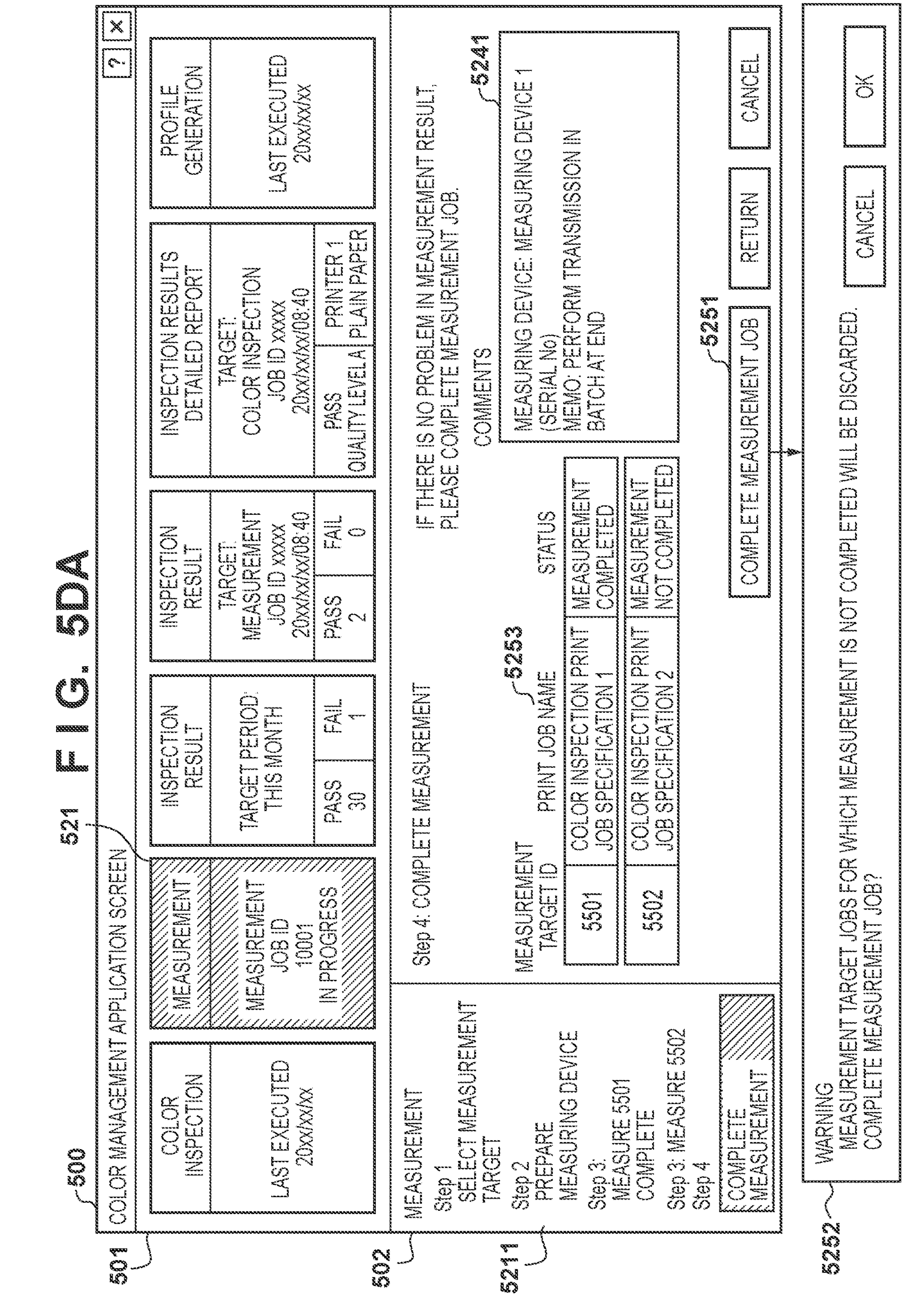
FIGS. 5DA and 5DB are diagrams illustrating examples of the operation screen to be displayed on a display unit by the color management apparatus according to the embodiment.
Figure 5D:
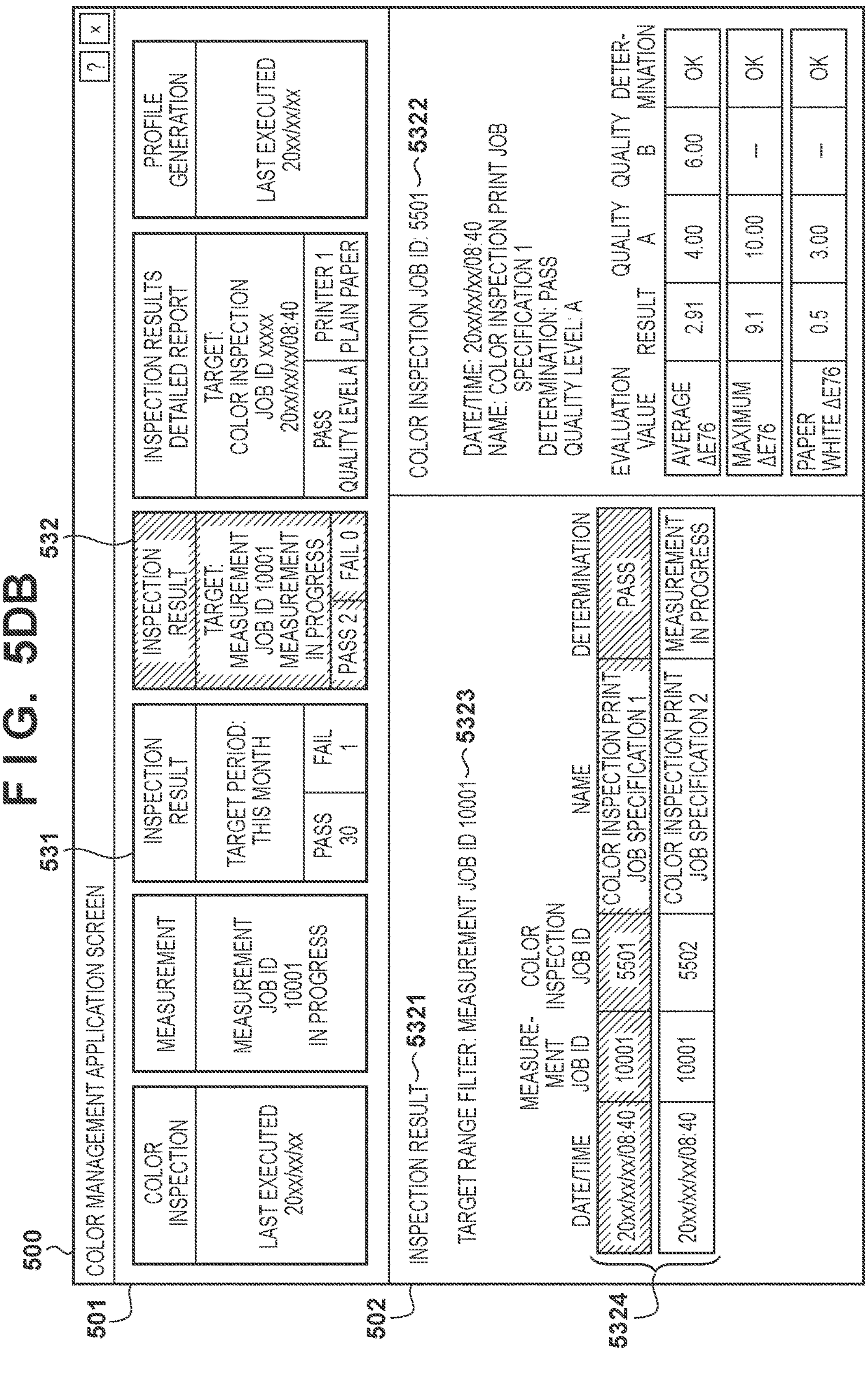

The measurement completion step illustrated in FIG. 5DA indicates a case when the UI control module 402 is in a setting "manually transmit measurement results at end" in the transmission control options 5244 or a case when there is "one" measurement target ID, and the comment field 5241 for the measurement target ID is displayed.

Furthermore, in the measurement completion step of FIG. 5CB in which the measurement result is transmitted as appropriate, the UI control module 402 displays a list 5253 of measurement target IDs, which are measurement targets in the measurement job, and displays statuses (measurement completed, measurement not completed, transmission in progress, transmission completed, or the like) related to respective measurement target IDs. Assume that the UI control module 402 periodically confirms the statuses related to the respective measurement target IDs and updates the display. Then, upon accepting a press of the complete measurement job button 5251, the UI control module 402 closes the measurement job.

When a press of the complete measurement job button 5251 is accepted while there is a measurement target ID for which measurement is not completed or transmission is in progress, the UI control module 402 displays a warning 5252 for discarding an incomplete measurement target job as illustrated in FIG. 5CB.

Finally, in the measurement control module 405 of FIG. 5DA in which the measurement results are collectively transmitted, upon accepting a press of the complete measurement job button 5251, the measurement control module 405 collectively transmits a measurement job ID, a color inspection job ID, information of the comment field 5241, a patch measurement results, and the like, to the color inspection processing module 406 for one or more measurement target ID for which measurement is completed. When a press of the complete measurement job button 5251 is accepted while there is a measurement target ID for which measurement is not completed, the UI control module 402 displays the warning 5252 for discarding an incomplete measurement target job as illustrated in FIG. 5DA.

Next, an overview of an inspection result screen displayed in the function display area 502 will be described with reference to FIG. 5DB. The function display area 502 in the inspection result confirmation function includes an inspection result list display area 5321 and an inspection result overview display area 5322 for the color inspection job ID selected in the inspection result list display area 5321. In the area 5322, the execution date and time, name, determination result and quality level of the color inspection print job specification 1 selected in a color inspection result list 5324 as well as the determination result for the evaluation value and the like are displayed.

One of features of the embodiment is that upon receiving that a measurement job ID is set in a target range filter 5323, the UI control module 402 extracts from the measurement targets only the color inspection jobs corresponding to the designated measurement job ID and displays the color inspection result list 5324. In addition, the color inspection result list 5324 displays the status (pass, fail, measurement in progress, measurement not completed, etc.) related to each color inspection job ID. The target range filter 5323 is not limited to the measurement job ID and need only be information that is associated with the measurement job ID.

Upon accepting the measurement result of a color inspection job from the measurement control module 405, the color inspection processing module 406 starts the color inspection processing. In the embodiment, since the measurement control module 405 can transmit the measurement result as appropriate for each measurement target ID, there is a status in which the color inspection processing module 406 has not received the measurement result of a color inspection job. Therefore, assume that the UI control module 402 includes the display of a measurement in progress status in the color inspection result list 5324, which has been filtered for the measurement job ID, and the inspection result function card 532. When the measurement control module 405 closes a measurement job while the measurement result corresponding to a respective color inspection job ID has not been transmitted, the UI control module 402 displays a status, such as measurement not completed, in the inspection result list 5324. Assume that the UI control module 402 periodically confirms the statuses related to the color inspection job IDs and updates the display.

Figure 7:
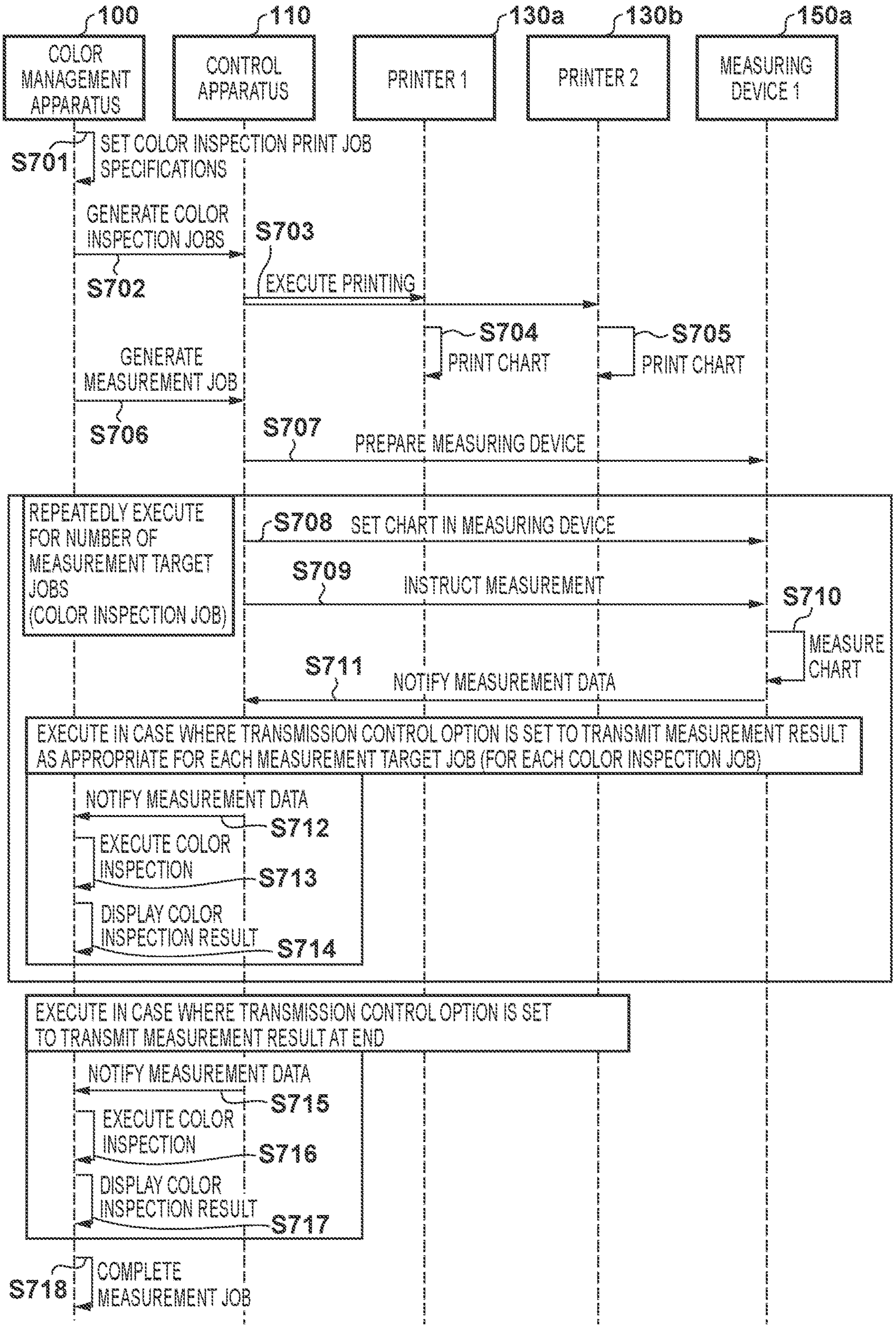
FIG. 7 is a sequence diagram for explaining a flow of processing in the color management system according to the present embodiment.

FIG. 7 is a sequence diagram for explaining a flow of processing in the color management system according to the present embodiment. Here, a case when measurement is performed in a measurement job in which two color inspection jobs for the printer 1 and the printer 2 have been collectively set as measurement targets, the measurement result of each color inspection job is transmitted as appropriate, color inspection is performed will be described as an example. In the following description, the symbol "S" means step.

In S701, the color inspection print job specification setting module 401 sets the specifications of a color inspection print job based on a user input accepted from the UI control module 402. Here, assume that the color inspection print job specification 1 for the printer 1 (130*a*) (plain paper), which is a target of color inspection, and the color inspection print job specification 2 for the printer 2 (130*b*) (coated paper), which is a target of color inspection, have been set as illustrated in FIG. 5AA.

Next, in S702, upon receiving a press of the start inspection job button 514 while the color inspection print job specification 1 and the color inspection print job specification 2 are designated from the UI control module 402 as indicated in FIG. 5AA, the color inspection job generation module 403 generates color inspection jobs. In the spirit of the embodiment, the color inspection job may be generated one at a time and a plurality of color inspection jobs may be generated.

Next, the color inspection job generation module 403 issues a color inspection job ID "5501" to the color inspection print job specification 1 and a color inspection job ID "5502" to the color inspection print job specification 2, as shown in FIG. 5AB. Then, the color inspection job generation module 403 generates a color inspection chart as illustrated in FIG. 8 and transmits the generated color inspection chart and a color inspection job included in the color inspection print job specification to the control apparatus 110 via the network I/F 107.

Figure 8:
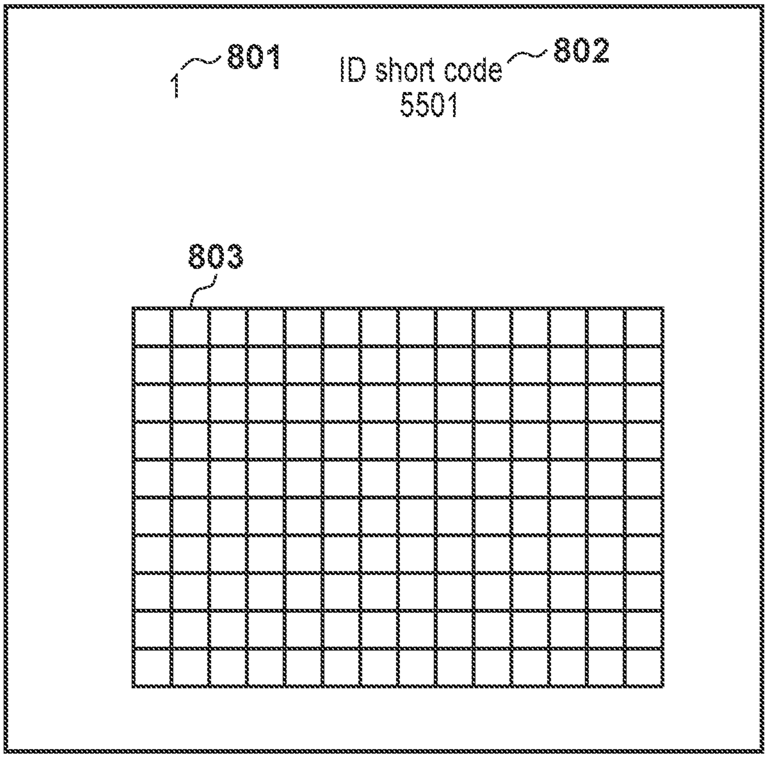
FIG. 8 is a diagram illustrating an example of a color inspection chart according to the embodiment.

FIG. 8 is a diagram illustrating an example of a color inspection chart according to the embodiment.

A reference numeral 801 denotes a page number of the chart, and if the chart used for color inspection is constituted by a plurality of pages, the number of the page number 801 is incremented. A reference numeral 802 denotes a color inspection job ID. The color inspection job ID 802 is an ID value that is designated as a measurement target ID to be set as a measurement target when generating a measurement job. Here, an ID "5501" corresponding to the color inspection print job specification 1 is set. A reference numeral 803 denotes patches and is constituted by signal values based on a chart specification included in the color inspection print job specification. In addition, a patch size and a patch arrangement are made to be such that measurement by the designated measuring device is possible based on the measuring device and print layout information included in the color inspection print job specification.

In S703, the control apparatus 110 generates a print job based on a printer, sheet information, and print condition information included in the color inspection print job specification of the received color inspection job and transmits the print job to the target printer. In the embodiment, a print job is transmitted to the printer 1 (130*a*) and the printer 2 (130*b*).

In S704, upon receiving a print job in this way, the printer 130*a* performs print processing based on the print job and outputs a chart. In S705, upon receiving a print job in this way, the printer 130*b* performs print processing based on the print job and outputs a chart.

Next, in S706, upon receiving a press of the start measurement job button 5215 from the UI control module 402 while a plurality of measurement target IDs (color inspection job IDs: 5501 and 5502) are being designated as illustrated in FIG. 5AB, the measurement job generation module 404 starts generation of a measurement job.

The measurement job generation module 404 issues one measurement job ID "10001" for a plurality of measurement target IDs (color inspection job IDs: 5501 and 5502), as shown in FIG. 5BA.

Next, in S707, the control apparatus 110 searches for a measuring device to be connected to the control apparatus 110 based on measuring device information included in the received color inspection print job specification as illustrated in FIG. 5BA and makes a connection request to the corresponding measuring device 150*a*. Then, the control apparatus 100 cooperates with the measuring device 150*a* and performs a measuring device preparation operation, such as calibration.

The measurement of charts using the measuring device 150*a* is thus started. First, in S708, the control apparatus 110 performs processing for prompting the user to measure a chart to which the measurement target ID is assigned as illustrated in FIG. 5BB. By this, the user makes it possible for the chart to be measured by the measuring device 150*a*.

Next, in S709, the control apparatus 110 instructs the measuring device 150*a* to measure the charts. By this, in S710, the measuring device 150*a* measures the charts. In S711, the measuring device 150*a* notifies the control apparatus 110 of the measurement results of the charts. The chart measurement instruction to the measuring device 150*a*, the chart measurement by the measuring device 150*a*, and the notification of the measurement result to the control apparatus 110 performed in from S709 to S711 are only one example. Assume that, depending on the measuring device and the measurement condition, units in which the measurement result is notified, such as units of patches, units of patch rows, and units of pages, change in addition to the method of issuing an instruction to the measuring device and the measurement method.

Next, upon receiving a setting of the transmission control options 5244 illustrated in FIG. 5CA-2 from the UI control module 402, the color management apparatus 100 and the control apparatus 110 switch between execution of S712 to S714 and execution of S715 to S717. When the setting "manually or automatically transmit measurement result as appropriate for each measurement target ID" is made in the transmission control options 5244, the color management apparatus 100, and the control apparatus 110 execute from S712 to S714. When the setting "manually transmit measurement results at end" is made, the color management apparatus 100, and the control apparatus 110 execute from S715 to S717.

First, a case when the color management apparatus 100 and the control apparatus 110 execute from S712 to S714, which is one of the features of the embodiment, will be described.

In S712, upon receiving a press the transmit button 5242 corresponding to a target measurement target ID from the UI control module 402 as illustrated in FIG. 5CA-1, the control apparatus 110 notifies the color management apparatus 100 of the measurement result of the color inspection job ID corresponding to the target measurement target ID. At this time, the control apparatus 110 performs screen transition to the measuring work related to another measurement target ID included in the measurement job without waiting for the reception completion notification for the measurement result from the color management apparatus 100 and performs the chart measuring work using the measuring device in S708 to S711. Since the subsequent S712 and S713 are not measuring work, the color management apparatus 100 executes processing in the background.

Subsequently, in S713, the color management apparatus 100 executes the color inspection processing based on the received measurement result of the color inspection job ID and the specification information of the color inspection print job associated with the color inspection job ID. In S714, among the color inspection jobs included in the measurement job, the color management apparatus 100 reflects the color inspection jobs as appropriate in the display of color inspection results starting from those whose inspection result has been outputted, as illustrated in FIG. 5DB. This is also one of the features of the embodiment. Then, the processing from S708 to S714 is repeatedly executed for the number of color inspection jobs included in the measurement job.

In the embodiment, the notification of the measurement result from the control apparatus 110 to the color management apparatus 100 in S712 is performed for each measurement target ID, but the present invention is not limited thereto. For example, a configuration may be such that the measurement result notification to the color management apparatus 100 is performed in small units, such as units of patches and the color management apparatus 100 starts the color inspection processing as appropriate when the measurement result is received in units of color inspection job IDs.

Thus, a color manager or a production supervisor can confirm the inspection result screen of the color management apparatus 100 while collectively conducting color inspection job measuring work. Thus, it is possible to confirm a printer in which the color inspection has been completed first and to start the production of commercial printed items by using the confirmed printer.

Next, the processing in which the color management apparatus 100 and the control apparatus 110 execute S715 to S717 according to a setting of the transmission control options 5244 will be described.

In S715 to S717, units in which the measurement results are notified from the control apparatus 110 to the color management apparatus 100 in S715 are different from the case of S712 to S714. In S715, the control apparatus 110 collectively notifies the color management apparatus 100 of the measurement results of all the measurement target IDs included in the measurement job at the end as illustrated in FIG. 5DA. Since the subsequent S716 and S717 are not measuring work, the color management apparatus 100 executes processing in the background.

In S716, the color management apparatus 100 executes the color inspection processing based on all the received measurement results of the color inspection job ID and the specification information of the color inspection print job associated with the color inspection job ID. In S717, among the color inspection jobs included in the measurement job, the color management apparatus 100 reflects the color inspection jobs as appropriate in the display of color inspection results starting from those whose inspection result has been outputted, as illustrated in FIG. 5DB.

Finally, in S718, the color management apparatus 100 displays the inspection result of the measurement target ID included in the measurement job and the status indicating the measurement status, for example, as illustrated in FIGS. 5CB and 5DA. Then, upon accepting a press of the complete measurement job button 5251 from the UI control module 402, the color management apparatus 100 terminates the measurement job. At this time, when there is an incomplete job among the measurement target jobs, the UI control module displays the warning 5252 as illustrated in FIG. 5CB and FIG. 5DA.

Assume that, in the present embodiment, the complete measurement job button 5251 has both a function of transmitting a measurement result whose status is measurement completed and that has not been transmitted and a function of completing the measurement job. Therefore, in the case of settings in which S715 to S717 are to be executed, in S715, upon receiving a press of the complete measurement job button 5251 from the UI control module 402, the color management apparatus 100 executes the processing of S715 and S718. However, the present invention is not limited thereto, and the function of transmitting the measurement result and the function of completing the measurement job may be divided. In that case, in S715, the transmit button 5242 of FIG. 5CA-1 is displayed in FIG. 5DA, and in S718, the complete measurement job button 5251 is displayed in FIG. 5DA.

The above is the flow of the entire processing in the color management system according to the embodiment. In the embodiment, the measurement target is a color inspection job, but the present invention is not limited thereto. For example, a profile generation chart generated by a profile generation job generation module (not illustrated), which corrects the colors of the printer, may be used as a measurement target.

Figure 9A:
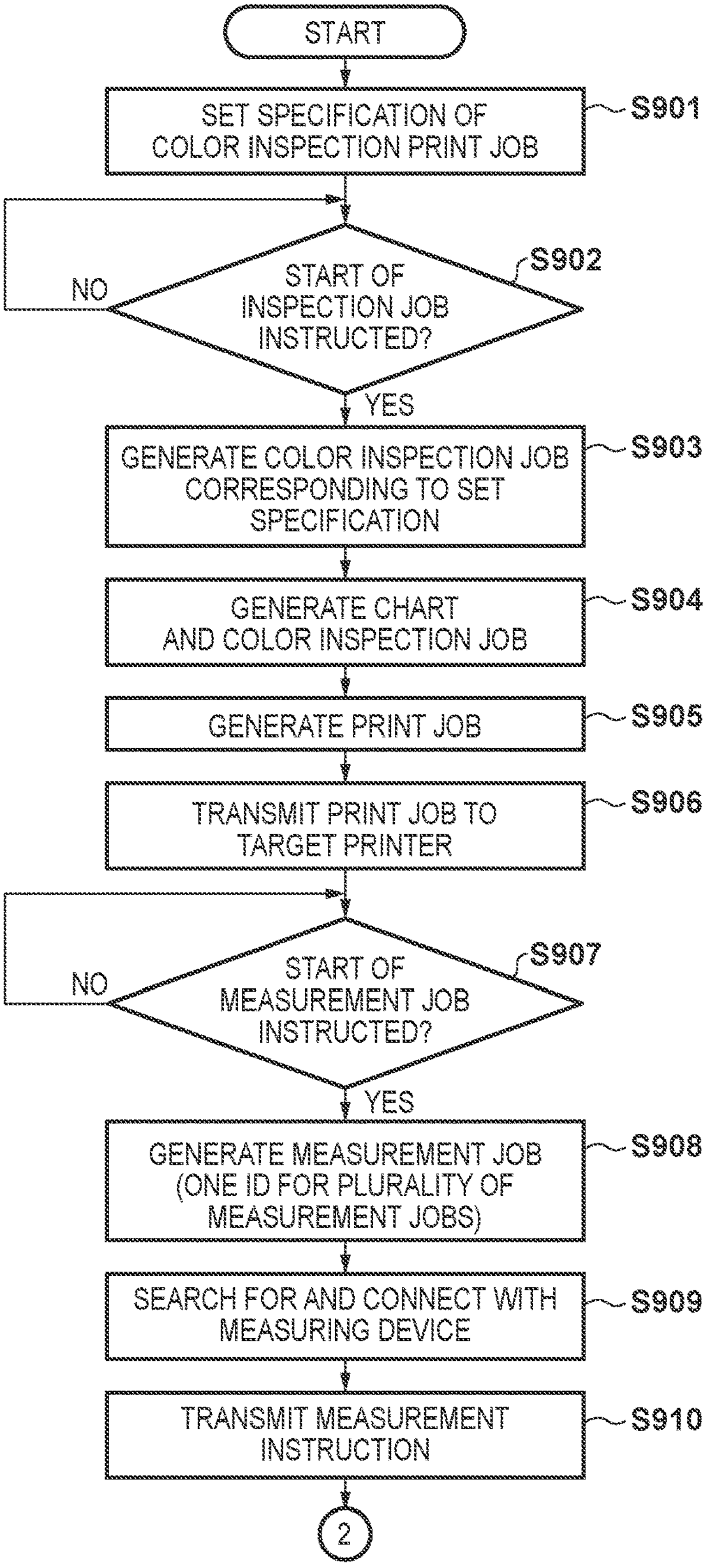
FIGS. 9A and 9B are flowcharts for explaining processing to be executed by the color management apparatus and the control apparatus according to the embodiment.
Figure 9B:
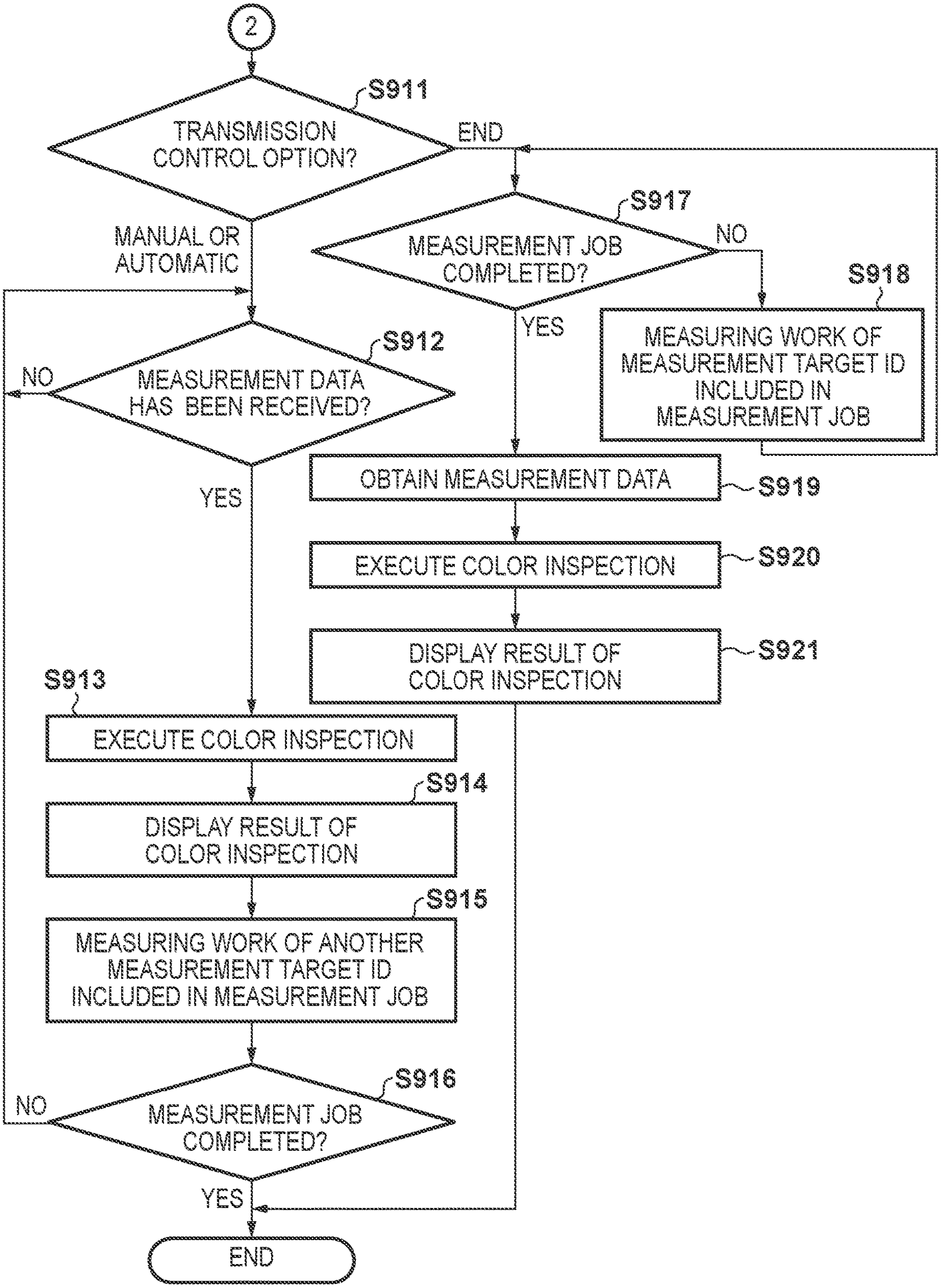

FIGS. 9A and 9B are flowcharts for explaining processing to be executed by the color management apparatus 100 and the control apparatus 110 according to the embodiment. As described above, a description will be given assuming that the processing is to be performed by an information processing apparatus that has both functions of the color management apparatus 100 and the control apparatus 110. The processing described in this flowchart is realized by the CPU 101 deploying a program in the RAM 103 and executing the program.

First, in step S901, the CPU 101 sets the specification of the color inspection print job as described in, for example, the above FIG. 5AA, based on a user input. Next, the processing proceeds to step S902, and the CPU 101 determines whether a press of the start inspection job button 514 has been received in a state in which a plurality of color inspection print job specifications are set and the color inspection print job specifications are designated as illustrated in the above FIG. 5AA, for example. A press of the start inspection job button 514 is thus accepted, and the processing proceeds to step S903. In step S903, the CPU 101 generates color inspection jobs. Here, the color inspection job ID 5501 is issued to the color inspection print job specification 1 and the color inspection job ID 5502 is issued to the color inspection print job specification 2. The processing proceeds to step S904, and the CPU 101 generates a color inspection chart and generates a color inspection job including that generated color inspection chart and the color inspection print job specification.

Next, the processing proceeds to step S905, and the CPU 101 generates a print job based on a printer, a sheet, and print condition information included in the color inspection print job specification of the color inspection job. The processing proceeds to step S906, and the CPU 101 transmits that print job to a target printer designated in the color inspection print job specification.

Next, the processing proceeds to step S907, and the CPU 101 determines whether a press of the start measurement job button 5215 has been received in a state in which a plurality of measurement target IDs are designated as illustrated in the above FIG. 5AB, for example, and, upon a press of the start measurement job button 5215, the processing proceeds to step S908 and the CPU 101 generates a measurement job. At this time, the CPU 101 issues one measurement job ID for a plurality of measurement target IDs. Next, the processing proceeds to step S909, and the CPU 101 searches for a measuring device to be connected to the control apparatus 110 based on the measuring device information included in the color inspection print job specification and makes a connection request to the corresponding measuring device 150*a*. Then, the processing proceeds to step S910, and the CPU 101 instructs the measuring device to measure the charts. Thus, the measuring device measures the charts and notifies the measurement data.

Next, the processing proceeds to step S911 in FIG. 9B, and the CPU 101 determines whether a setting of the transmission control options 5244 is the setting "manually or automatically transmit measurement result as appropriate for each measurement target ID" illustrated in FIGS. 5CA-2 and, if so, the processing proceeds to step S912. In step S912, if manual, upon receiving a press of the transmit button 5242 corresponding to a target measurement target ID, the CPU 101 receives the measurement data of the color inspection job ID, and if automatic, the CPU 101 receives the measurement data of the color inspection job ID without waiting for a press of the transmit button. Then, upon having received measurement data, the processing proceeds from step S912 to step S913 and the CPU 101 executes the color inspection processing based on the received measurement data of the color inspection job ID and the specification information of the color inspection print job associated with the color inspection job ID. If having not received the measurement data in step S912, the CPU 101 waits for receiving the measurement data in step S912. Then, the processing proceeds to step S914, and among the color inspection jobs included in the measurement job, the CPU 101 reflects the color inspection jobs as appropriate in the display of color inspection results starting from those whose inspection result has been outputted, as illustrated in FIG. 5DB, for example. Then, the processing proceeds to step S915, and the CPU 101 performs screen transition to the measuring work related to another measurement target ID included in the measurement job and performs the chart measuring work using the measuring device, as previously described with reference to FIG. 7. Then, the processing proceeds to step S916, and upon a press of the complete measurement job button 5251 or detecting the end of the measurement job, the CPU 101 ends the processing and, when it is not the end of the measurement job, the processing proceeds to step S912, the CPU 101 waits to receive measurement data that is a result of the measuring work related to the next measurement target ID, and executes the above processing.

Meanwhile, in step S911, of a setting of the transmission control options 5244 is the setting "manually transmit measurement results at end", the processing proceeds to step S917. In step S917, the CPU 101 determines whether the complete measurement job button 5251 has been pressed. In step S917, when the complete measurement job button 5251 is not pressed, the processing proceeds to step S918, and the CPU 101 makes a transition of a screen of the measuring work related to a measurement target ID included in the measurement job and performs the chart measuring work using the measuring device. Then, in step S917, when the complete measurement job button 5251 is pressed, the processing proceeds to step S919, and the CPU 101 collectively obtains the measurement results of all measurement target IDs included in that measurement job at the end of the measurement job. The processing proceeds to step S920, and the CPU 101 executes the color inspection processing based on the measurement data of the color inspection job ID and the specification information of the color inspection print job associated with the color inspection job ID. Then, the processing proceeds to step S921, and the CPU 101 displays the determination information (color inspection result or processing status) of color inspection job IDs included in the measurement job ID as illustrated in FIG. 5DB, for example, and ends the processing. A configuration may be taken such that in step S917 and step S918, step S918 is executed until the measurement is completed, and when the measurement is completed, the processing proceeds to step S919.

As described above, according to the embodiment, it is possible to consecutively measure the charts of a plurality of color inspection jobs in one measurement job, and thus, efficient measuring work is possible. Then, by conducting as appropriate color inspection processing based on the measurement result of each color inspection job, it is possible to confirm the inspection result starting from the color inspection job for which measurement is completed, without waiting for completion of chart measurement of all color inspection jobs included in that measurement job. This makes it possible to achieve both efficiency of measuring work and a state in which inspection results can be confirmed as appropriate from those for which measurement is completed.

OTHER EMBODIMENTS

Embodiments of the present disclosure can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., an application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An information processing apparatus operable to manage a color to be printed by a printer based on measurement data of color patches arranged on a chart printed by the printer, the apparatus comprising:

one or more controllers including one or more processors and one or more memories, the one or more controllers configured:

to set a specification of a color inspection print job necessitating measurement for managing color;

to generate a color inspection job based on the set specification of the color inspection print job;

in a case when there are a plurality of charts corresponding to a plurality of color inspection jobs, each chart having been printed by the printer based on a respective color inspection job, to generate a measurement job in which the plurality of charts are collectively designated as measurement targets;

to obtain a measurement result for the chart for each of the plurality of color inspection jobs designated as the measurement target, and to output the measurement result as appropriate for each color inspection job; and to perform processing for managing the color based on the measurement result and the specification of the color inspection print job.

2. The information processing apparatus according to claim 1, wherein the specification of the color inspection print job includes a specification of a color inspection print job for inspecting a color accuracy of the printer or a specification of a profile generation job for correcting the color accuracy of the printer.

3. The information processing apparatus according to claim 1, wherein the specification of the color inspection print job includes a printer to be used in the color inspection print job and a setting of a sheet on which printing is to be printed by the printer.

4. The information processing apparatus according to claim 1, wherein, in the generation of the color inspection job, in a case that specifications of a plurality of color inspection print jobs are set in the setting of the specification of the color inspection print job, the one or more controllers are further configured to generate a plurality of color inspection jobs corresponding to respective specifications of a plurality of color inspection print jobs.

5. The information processing apparatus according to claim 1, wherein, in the processing for managing the color, the one or more controllers are further configured to inspect a color accuracy of the printer or correct the color accuracy of the printer.

6. The information processing apparatus according to claim 1, wherein, when obtaining and outputting the measurement result, after notifying a measurement result of one color inspection job, the one or more controllers are further configured to start measurement of a color inspection job of a next measurement target without waiting for obtainment of a completion of notification of the measurement result.

7. The information processing apparatus according to claim 1, wherein, when obtaining and outputting the measurement result, the one or more controllers are further configured to include a transmission control option for manually or automatically performing notification of a measurement result for each color inspection job.

8. The information processing apparatus according to claim 7, wherein, when obtaining and outputting the measurement result, in a case of automatically performing notification of a measurement result based on a setting of the transmission control option, the one or more controllers are further configured to automatically add a comment based on a setting of an automatic transmission registration comment.

9. The information processing apparatus according to claim 1, wherein the color inspection jobs for measurement targets each includes processing for measuring the chart by a measuring device.

10. The information processing apparatus according to claim 1, wherein the measurement job is managed using one piece of identification information for the plurality of color inspection jobs.

11. The information processing apparatus according to claim 9, wherein, when obtaining and outputting the measurement result, in a case when there are a plurality of color inspection jobs to be measurement targets and a measurement result is to be manually outputted as appropriate for each color inspection job, the one or more controllers are further configured to divide the measurement processing into sub-steps including measurement by the measuring device and obtainment of measurement data from the measuring device.

12. The information processing apparatus according to claim 1, wherein, in the processing for managing the color, the one or more controllers are further configured to filter and display a result of that processing in units of the measurement job.

13. The information processing apparatus according to claim 11, wherein, when obtaining and outputting the measurement result, the one or more controllers are further configured to display statuses of the sub-steps for each color inspection job.

14. A non-transitory computer-readable storage medium storing a program for causing a processor to execute a method of controlling an information processing apparatus operable to manage a color to be printed by a printer based on measurement data of color patches arranged on a chart printed by the printer, the method comprising:

setting a specification of a color inspection print job necessitating measurement for managing color;

generating a color inspection job based on the set specification of the color inspection print job;

in a case when there are a plurality of charts corresponding to a plurality of color inspection jobs, each chart having been printed by the printer based on a respective color inspection job, generating a measurement job in which the plurality of charts are collectively designated as measurement targets;

obtaining a measurement result for the chart for each of the plurality of color inspection jobs designated as the measurement target, and outputting the measurement result as appropriate for each color inspection job; and performing processing for managing the color based on the measurement result and the specification of the color inspection print job.

* * * * *